US009602916B2

(12) United States Patent
Asada

(10) Patent No.: US 9,602,916 B2
(45) Date of Patent: Mar. 21, 2017

(54) SIGNAL PROCESSING DEVICE, SIGNAL PROCESSING METHOD, MEASUREMENT METHOD, AND MEASUREMENT DEVICE

(71) Applicant: Sony Corporation, Tokyo (JP)

(72) Inventor: Kohei Asada, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/437,884

(22) PCT Filed: Sep. 12, 2013

(86) PCT No.: PCT/JP2013/074734
§ 371 (c)(1),
(2) Date: Apr. 23, 2015

(87) PCT Pub. No.: WO2014/069111
PCT Pub. Date: May 8, 2014

(65) Prior Publication Data
US 2015/0296290 A1 Oct. 15, 2015

(30) Foreign Application Priority Data
Nov. 2, 2012 (JP) ................................. 2012-242875

(51) Int. Cl.
*H04M 5/02* (2006.01)
*H04R 1/40* (2006.01)
(Continued)

(52) U.S. Cl.
CPC ................. *H04R 1/40* (2013.01); *G01H 7/00* (2013.01); *G10K 15/12* (2013.01); *H04R 3/005* (2013.01);
(Continued)

(58) Field of Classification Search
CPC .......... H04R 3/12; H04R 3/005; H04R 1/403; H04R 1/406; H04R 2201/405;
(Continued)

(56) References Cited

U.S. PATENT DOCUMENTS 6,608,903 B1 8/2003 Miyazaki et al.
7,233,673 B1* 6/2007 Poletti .................... G10K 15/08
381/63

(Continued)

FOREIGN PATENT DOCUMENTS

EP 0335468 A1 10/1989
EP 0735796 A2 10/1996
(Continued)

OTHER PUBLICATIONS

U.S. Appl. No. 14/438,437, filed Apr. 24, 2015, Asada et al.
(Continued)

*Primary Examiner* — Akelaw Teshale
(74) *Attorney, Agent, or Firm* — Wolf, Greenfield & Sacks, P.C.

(57) ABSTRACT

Provided is a signal processing device including an input unit inputting a sound collection signal of a sound of a user collected by user-surrounding microphones with inward directivity in a reproduction environment, an acoustic-signal processing unit obtaining a reproduction signal of a sound field in a measurement environment by performing a process on the sound collection signal based on a transfer function measured based on a result of sequential emission of predetermined sounds from speakers at positions set on a first closed surface with outward directivity in the measurement environment and collection of the sounds with microphones at positions on a second closed surface with outward directivity in the measurement environment and indicates how the sounds are transferred to the positions on the second (Continued)

PLACE DESIRED TO BE REPRODUCED closed surface, and a sound-emission control unit causing user-surrounding speakers to emit sound based on the reproduction signal with inward directivity in the reproduction environment.

19 Claims, 27 Drawing Sheets

(51) Int. Cl.
*G01H 7/00* (2006.01)
*G10K 15/12* (2006.01)
*H04R 5/02* (2006.01)
*H04S 7/00* (2006.01)
*H04R 3/00* (2006.01)
*H04S 5/00* (2006.01)

(52) U.S. Cl.
CPC ............... *H04R 5/02* (2013.01); *H04S 5/00* (2013.01); *H04S 7/30* (2013.01); *H04S 2400/11* (2013.01); *H04S 2400/15* (2013.01)

(58) Field of Classification Search
CPC ...... H04R 2430/23; H04R 29/00; H04R 1/06; H04R 1/40; H04R 1/46; H04R 2201/34; H04R 2201/401; H04R 2209/024; H04R 2225/025; H04R 2400/11; H04R 2420/07; H04R 5/04; H04R 2205/024; H04R 5/02; H04R 1/1083; H04R 2225/43; H04R 2499/15; H04R 5/033; H04R 2400/01; H04R 3/04; H04R 5/027; H04R 1/323; H04R 2420/05; H04R 2430/21; H04R 2499/01
USPC 381/59, 300, 303, 386, 400, 56, 58, 61, 63, 381/92, 98, 17, 1, 26, 27, 3, 310, 307, 381/309, 71.1, 9, 6, 160, 19, 22, 23.1, 74, 381/94.3, 103, 104, 105, 106, 107, 122, 381/150, 18, 23, 305, 312, 316, 317, 318, 381/320, 340, 66, 71.11, 71.12, 4, 71.5, 381/71.6, 83, 86, 93, 94.8, 95
See application file for complete search history.

(56) References Cited

U.S. PATENT DOCUMENTS

| | | |
|---|---|---|
| 2006/0109988 A1 | 5/2006 | Metcalf |
| 2007/0025560 A1* | 2/2007 | Asada ................ G10K 15/12 381/61 |
| 2008/0056517 A1 | 3/2008 | Algazi et al. |
| 2009/0010443 A1 | 1/2009 | Ahnert et al. |
| 2010/0027805 A1 | 2/2010 | Itou et al. |
| 2010/0150359 A1 | 6/2010 | KnicKrehm et al. |
| 2012/0093320 A1 | 4/2012 | Flaks et al. |
| 2012/0307048 A1 | 12/2012 | Abrahamsson et al. |
| 2013/0272548 A1 | 10/2013 | Visser et al. |
| 2014/0098964 A1 | 4/2014 | Rosca et al. |
| 2014/0126758 A1 | 5/2014 | Van Der Wijst |
| 2015/0043756 A1 | 2/2015 | Ojanpera |
| 2015/0124167 A1 | 5/2015 | Arrasvuori et al. |
| 2015/0286463 A1 | 10/2015 | Asada et al. |

FOREIGN PATENT DOCUMENTS

| | | |
|---|---|---|
| EP | 2879402 A1 | 6/2015 |
| JP | 2000-099061 A | 4/2000 |
| JP | 2003-323179 A | 11/2003 |
| JP | 2006-085214 A | 3/2006 |
| JP | 2007-124023 A | 5/2007 |
| JP | 2008-227773 A | 9/2008 |
| JP | 4674505 B2 | 4/2011 |
| JP | 2011-138151 A | 7/2011 |
| JP | 4725234 B2 | 7/2011 |
| JP | 4735108 B2 | 7/2011 |
| JP | 4775487 B2 | 9/2011 |
| JP | 4883197 B2 | 2/2012 |

OTHER PUBLICATIONS

International Search Report and Written Opinion and English translation thereof dated Oct. 18, 2013 in connection with Application No. PCT/JP2013/074734.

International Preliminary Report on Patentability and English translation thereof dated May 14, 2015 in connection with Application No. PCT/JP2013/074734.

International Search Report and Written Opinion and English translation thereof dated Oct. 8, 2013 in connection with Application No. PCT/JP2013/074744.

International Preliminary Report on Patentability and English translation thereof dated May 14, 2015 in connection with Application No. PCT/JP2013/074744.

Extended European Search Report issued Sep. 16, 2016 in connection with European Application No. 13850571.4.

\* cited by examiner

FIG. 1
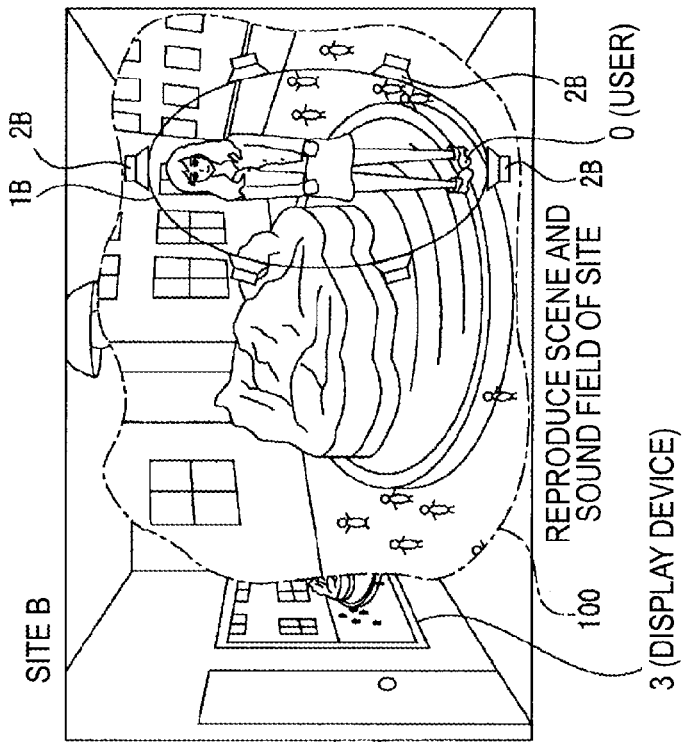
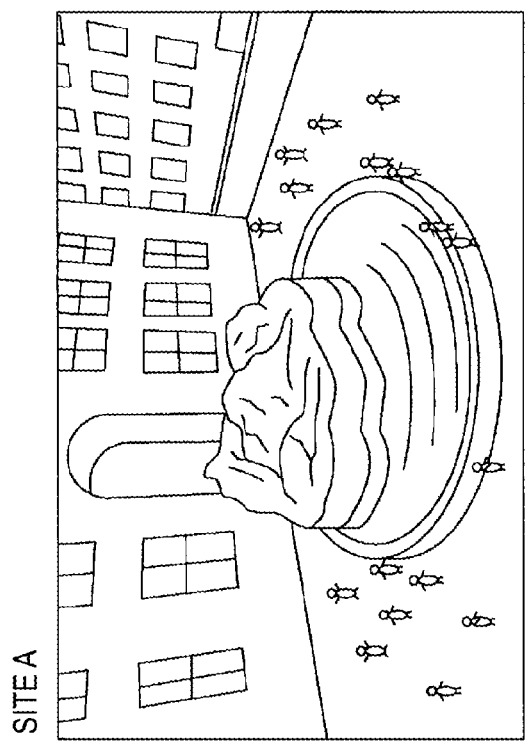

FIG. 3
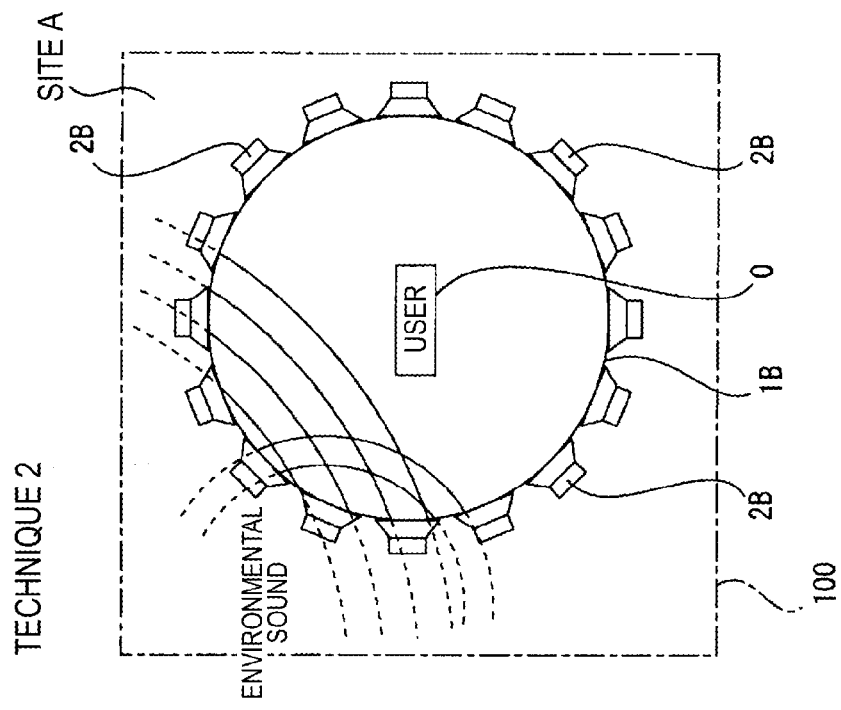
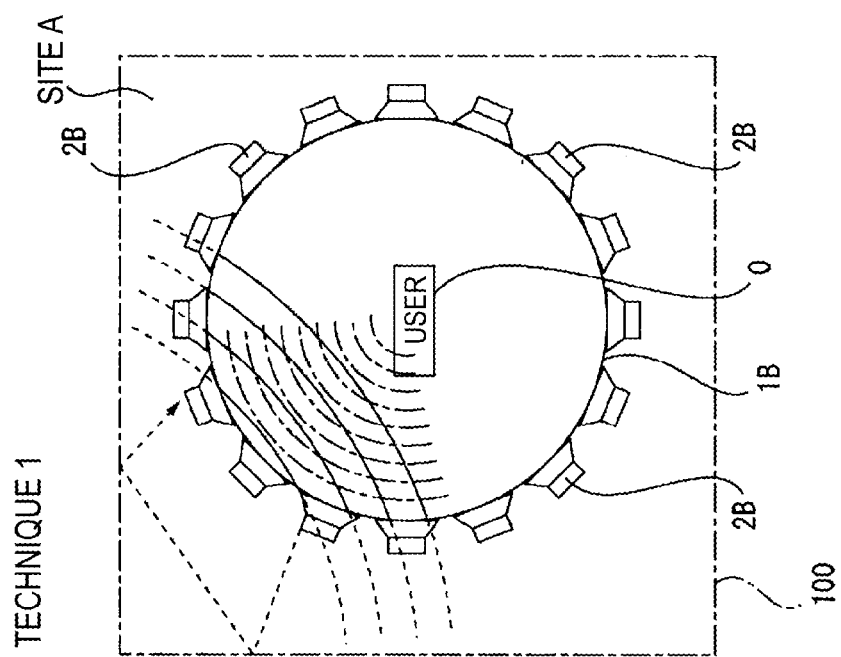

FIG. 13

| PLACE | IMAGE THAT MUST BE DISPLAYED | FIRST TRANSFER FUNCTION TO BE USED | OBJECT SOUND SOURCE TO BE USED | SECOND TRANSFER FUNCTION TO BE USED |
|---|---|---|---|---|
| 0001 | 0001 | 0001 | 0001 | 0001 |
| | | | 0002 | 0002 |
| | | | 0003 | 0003 |
| | | | 0004 | 0004 |
| 0002 | 0002 | 0002 | ... | ... |
| | | | 9999 | 9999 |
| ... | ... | ... | | |
| XXXX | XXXX | XXXX | XXXX | XXXX |

CORRESPONDENCE INFORMATION

FIG. 18
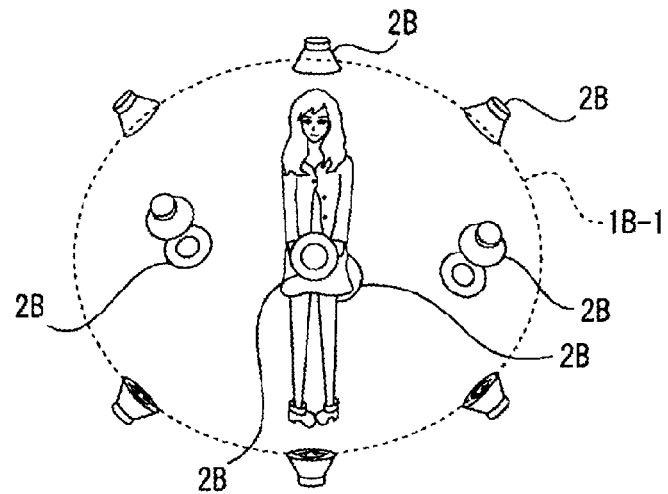
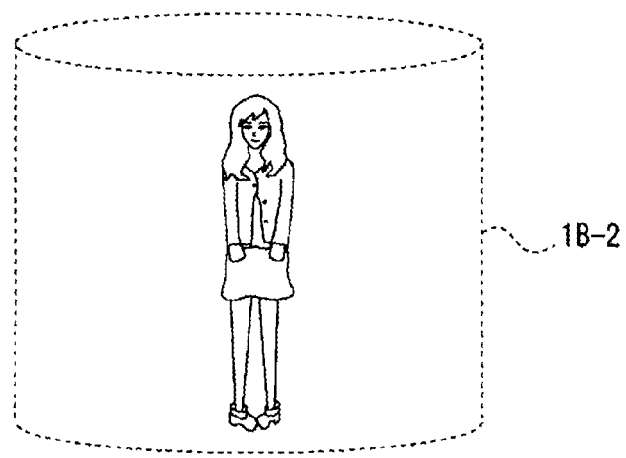
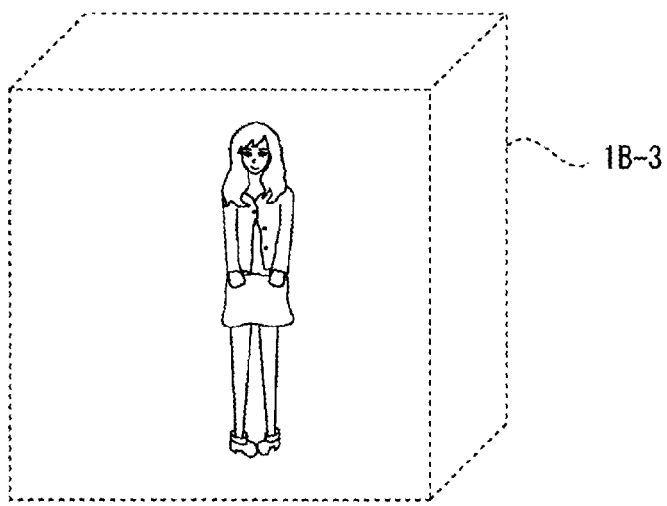

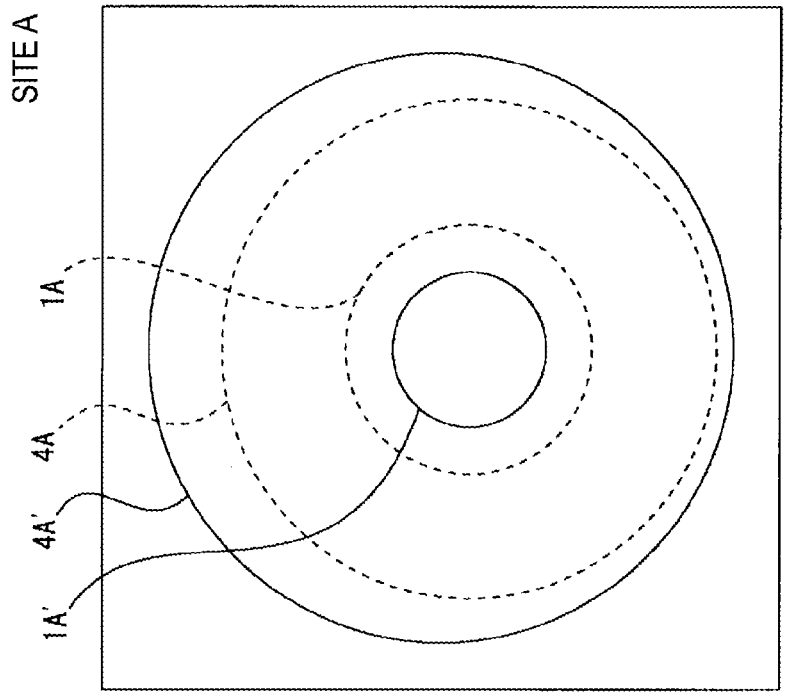
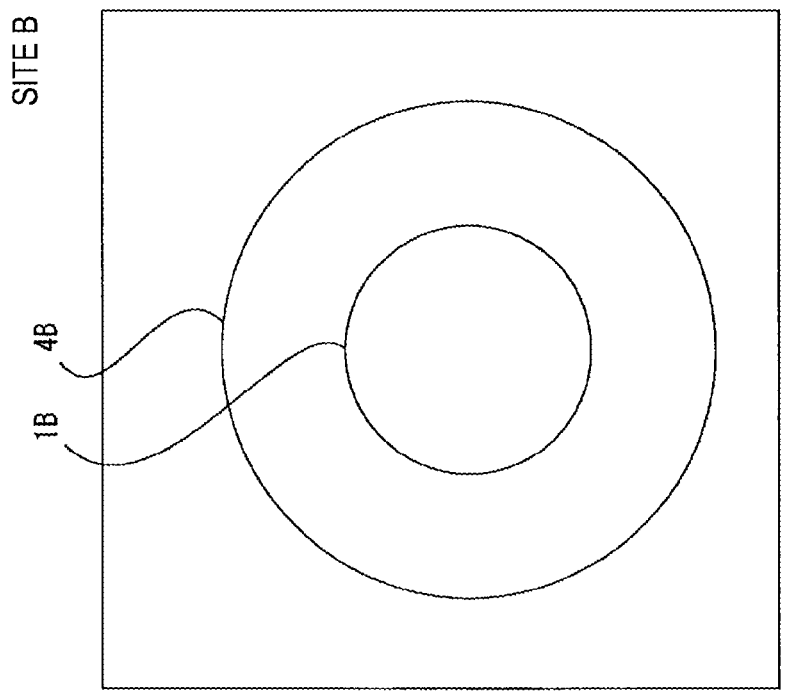
FIG. 23

A

B

| TRANSFER FUNCTION ID | SOUND EMISSION POSITION | SOUND RECEPTION POSITION | MEASUREMENT DATE AND TIME | DATA |
|---|---|---|---|---|
| 1001 | 35.660273N, 139.700077E | VEHICLE MIC 1 | 2012/6/16 22:54:01:01 | IMPULSE RESPONSE 1001 |
| 1002 | 35.660273N, 139.700079E | VEHICLE MIC 2 | 2012/6/16 22:54:01:03 | IMPULSE RESPONSE 1002 |
| ⋮ | ⋮ | ⋮ | ⋮ | ⋮ |
| 1100 | 35.660489N, 139.700397E | VEHICLE MIC N | 2012/6/16 22:54:02:31 | IMPULSE RESPONSE 1100 |

| TRANSFER FUNCTION ID | SOUND EMISSION POSITION | SOUND RECEPTION POSITION | MEASUREMENT DATE AND TIME | DATA |
|---|---|---|---|---|
| 1001 | 35.660273N, 139.700077E | 35.660195N, 139.700925 | 2012/6/16 22:54:01:01 | IMPULSE RESPONSE 1001 |
| 1002 | 35.660273N, 139.700079E | 35.660195N, 139.700920E | 2012/6/16 22:54:01:03 | IMPULSE RESPONSE 1002 |
| ⋮ | ⋮ | ⋮ | ⋮ | ⋮ |
| 1100 | 35.660489N, 139.700397E | 35.660371N, 139.700413E | 2012/6/16 22:54:02:31 | IMPULSE RESPONSE 1100 |

FIG. 27
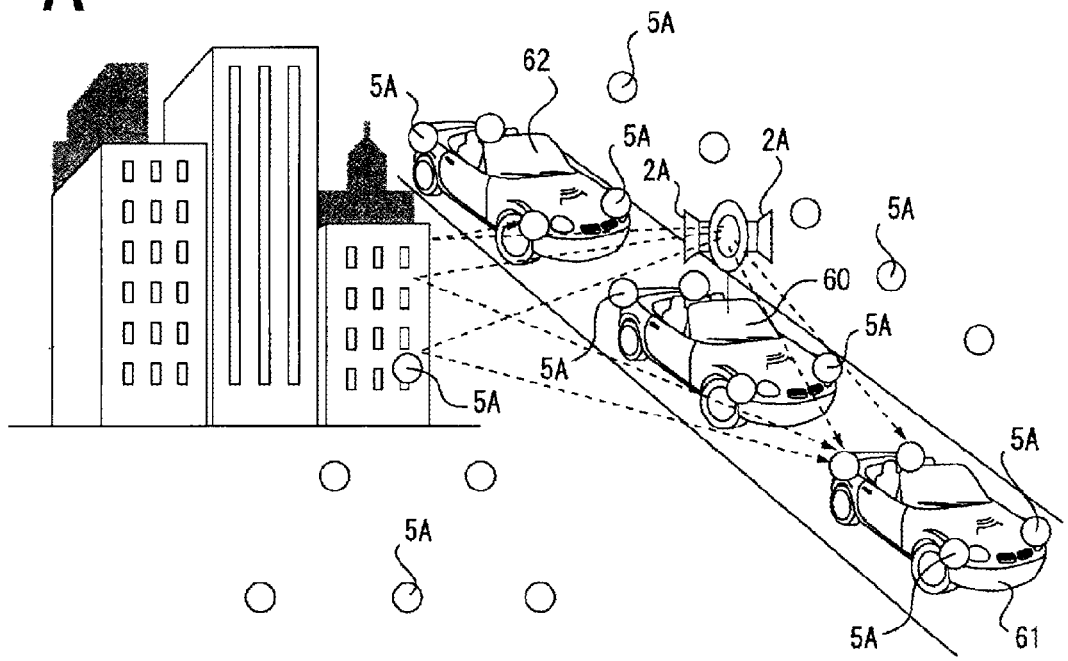
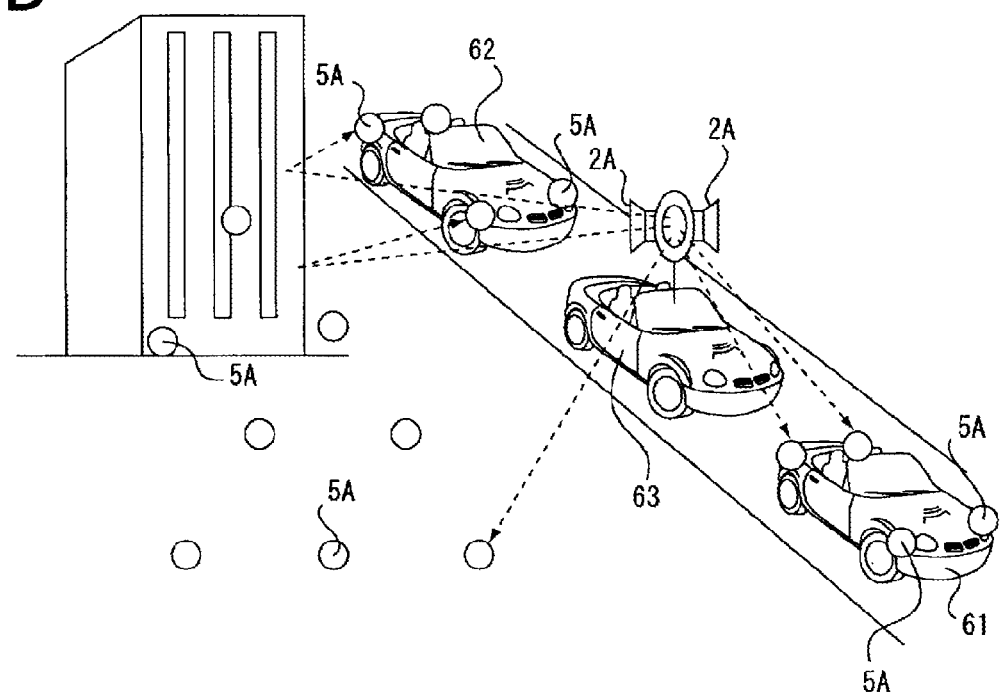

SIGNAL PROCESSING DEVICE, SIGNAL PROCESSING METHOD, MEASUREMENT METHOD, AND MEASUREMENT DEVICE

TECHNICAL FIELD

The present technology relates to a signal processing device that performs signal processing that is necessary for reproducing a sound field of a given target place in a different place and a method thereof. In addition, it relates to a measurement method and a measurement device for measuring an acoustic transfer function that is necessary for reproducing such a sound field.

BACKGROUND ART

For example, as disclosed in Patent Literatures 1 to 5, techniques for forming an acoustic closed surface with speakers which surround a user to cause the user who is inside the closed surface to perceive a sound field of a given target place or to localize a sound image outside the closed surface have been proposed.

The technologies of the related art disclosed in the Patent Literatures are all for reproducing sounds of an event that has occurred outside a closed surface.

CITATION LIST

Patent Literature

Patent Literature 1: JP 4674505B
Patent Literature 2: JP 4775487B
Patent Literature 3: JP 4725234B
Patent Literature 4: JP 4883197B
Patent Literature 5: JP 4735108B

SUMMARY OF INVENTION

Technical Problem

Meanwhile, in so-called sense-of-immersion technologies (immersive reality) in recent years, a technology for causing a user to feel like he or she is actually located in a given place has been widely studied.

In order to give such an auditory sense of immersion of a given target place, it is necessary to reproduce an impression of the place (an impression of a space) using sounds so that a user perceives the impression through them.

It is also possible in the exemplified technologies of the related art as described above to give a sense of presence and a sense of immersion with respect to such a place.

In order to give a user a stronger sense of presence and sense of immersion with respect to a given target place, however, a technology that can give an impression that the user is in the place using not only an event occurring outside a closed surface but also an event occurring inside the closed surface is desired.

The present technology has been developed taking the above-described circumstances into account, and in a technology that causes a user to auditorily perceive an impression of a given place (an impression of a space), aims to provide a technology that can heighten a sense of presence and a sense of immersion of the place.

Solution to Problem

In order to solve the above-described problem, the signal processing device according to the present technology is configured as described below.

The signal processing device according to the present technology includes an input unit configured to input a sound collection signal of a sound produced by a user which is obtained through sound collection by a plurality of microphones which are disposed to surround the user with inward directivity in a reproduction environment, an acoustic signal processing unit configured to obtain a reproduction signal for reproducing a sound field in a measurement environment by performing a process on the sound collection signal input by the input unit based on a transfer function which is measured based on a result obtained by sequentially emitting predetermined sounds from speakers at each of a plurality of positions which are set on a first closed surface with outward directivity in the measurement environment and then collecting the sequentially emitted sounds with microphones at a plurality of positions which are set on a second closed surface with outward directivity in the measurement environment and indicates how the sounds emitted from the respective plurality of positions on the first closed surface are transferred to the respective plurality of positions on the second closed surface, and a sound emission control unit configured to cause a plurality of speakers which are disposed to surround the user and perform sound emission with inward directivity in the reproduction environment to emit a sound based on the reproduction signal obtained by the acoustic signal processing unit.

In addition, according to the present technology, there is provided a signal processing method including an input procedure in which a sound collection signal of a sound produced by a user which is obtained through sound collection by a plurality of microphones which are disposed to surround the user with inward directivity in a reproduction environment is input, an acoustic signal processing procedure in which a reproduction signal for reproducing a sound field in a measurement environment is obtained by performing a process on the sound collection signal input in the input procedure based on a transfer function which is measured based on a result obtained by sequentially emitting predetermined sounds from speakers at each of a plurality of positions which are set on a first closed surface with outward directivity in the measurement environment and then collecting the sequentially emitted sounds with microphones at a plurality of positions which are set on a second closed surface with outward directivity in the measurement environment and indicates how the sounds emitted from the respective plurality of positions on the first closed surface are transferred to the respective plurality of positions on the second closed surface, and a sound emission control procedure in which a plurality of speakers which are disposed to surround the user and perform sound emission with inward directivity in the reproduction environment are caused to emit a sound based on the reproduction signal obtained in the acoustic signal processing procedure.

In addition, according to the present technology, there is provided a measurement method, wherein, based on a result obtained by sequentially emitting predetermined sounds from speakers at each of a plurality of positions which are set on a first closed surface with outward directivity in a measurement environment and collecting the sequentially output sounds with microphones at a plurality of positions which are set on a second closed surface with outward directivity in the measurement environment, a transfer function that indicates how the sounds emitted from the respective plurality of positions on the first closed surface are transferred to the respective plurality of positions on the second closed surface is measured.

In addition, according to the present technology, there is provided a measurement device including a sound emission control unit configured to cause speakers installed on a first closed surface to emit predetermined sounds in a manner that the predetermined sounds are sequentially emitted from each of a plurality of positions which are set on the first closed surface with outward directivity in a measurement environment, and a measurement unit configured to sequentially input sound collection signals of sounds that are sequentially emitted under control of the sound emission control unit and obtained through sound collection with microphones installed at a plurality of positions which are set on a second closed surface with outward directivity in the measurement environment, and to measure, based on the sound collection signals, a transfer function that indicates how the respective sounds emitted from the respective plurality of positions on the first closed surface are transferred to the plurality of positions on the second closed surface.

According to the signal processing device (or signal processing method) of the present technology described above, a sound field in which a sound emitted by a user who is positioned in a reproduction environment is sensed as if it were echoing in a place serving as a measurement environment is presented to the user.

Here, as in so-called "echolocation," an approximate space structure can be understood empirically through auditory perception and recognition of how a sound one has produced oneself travels. According to the present technology based on this perspective, a user can more easily acoustically perceive an impression of a space based on a sound he or she has produced. As a result, a sense of presence and a sense of immersion with respect to a given place can be heightened more than before.

In addition, according to the measurement method (and measurement device) of the present technology described above, measurement of a transfer function necessary for realizing such sound field reproduction can be realized.

Advantageous Effects of Invention

According to the signal processing device (and signal processing method) of the present technology described above, in a technology for causing a user to auditorily perceive an impression of a given place (an impression of a space), a sense of presence and a sense of immersion with respect to the place can be further heightened.

In addition, according to the measurement method (and measurement device) of the present technology, measurement of a transfer function necessary for realizing such sound field reproduction can be realized.

BRIEF DESCRIPTION OF DRAWINGS

FIG. 1 is a diagram for describing an overview of a reproduction technique realized in a signal processing system of an embodiment.

FIG. 3 is a diagram for describing an overview of a technique for sound field reproduction of an embodiment.

FIG. 13 is an illustrative diagram regarding the content of correspondence relation information.

FIG. 18 is an illustrative diagram regarding shapes of closed surfaces.

FIG. 23 is a diagram showing an example in which sizes and shapes of closed surfaces differ in a measurement environment and a reproduction environment.

FIG. 27 is an illustrative diagram regarding Measurement example 3 and Measurement example 4 in which moving objects are used.

DESCRIPTION OF EMBODIMENTS

Figure 2:
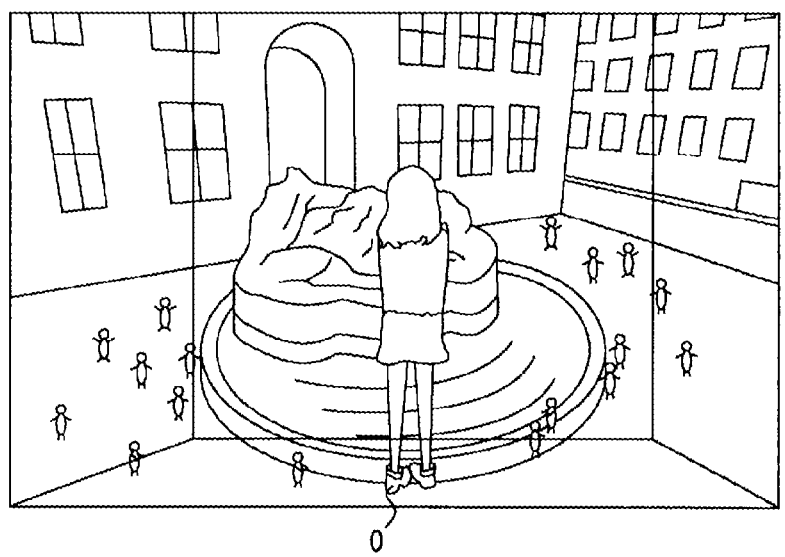
FIG. 2 is a diagram for describing a technique for sound field reproduction in an embodiment.

Hereinafter, embodiments relating to the present technology will be described. Note that description will be provided in the following order.

<1. Overview of a reproduction technique realized in a signal processing system of an embodiment>
<2. Techniques for sound field reproduction>
<3. Measurement technique for sound field reproduction>
(3-1. Overview of a measurement technique)
(3-2. Regarding Measurement 1)
(3-3. Regarding Measurement 2)
<4. Sound field reproduction based on transfer functions>
(4-1. Sound field reproduction based on a first transfer function)
(4-2. Sound field reproduction based on a second transfer function)
<5. Configuration of a signal processing system>
<6. Modified examples>
(6-1. Regarding a closed surface)
(6-2. Regarding directivity)
(6-3. Resolution for a case in which sizes and shapes of closed surfaces differ in a measurement environment and a reproduction environment)
(6-4. Measurement technique using moving objects)
(6-5. Other modified examples)

1. Overview of an Operation Realized in a Signal Processing System of an Embodiment First, an overview of a reproduction technique that is realized in a signal processing system of the present embodiment will be described using FIG. 1.

In FIG. 1, a site A refers to a place in which a user 0 is to be immersed, i.e., a place whose scene, spread of sound, and the like are desired to be reproduced (a place to be reproduced).

In addition, a site B of the drawing refers to a place in which a scene and spread of sound of a place to be reproduced are reproduced. This site B may be considered as, for example, a room of the user 0, or the like.

In the side B, a plurality of speakers 2B which are disposed to surround the user 0 and a display device 3 that displays an image are installed as shown in the drawing.

A reproduction method that is realized in the signal processing system of the present embodiment broadly includes displaying image information which corresponds to the site A using the display device 3 which is disposed in the site B, and reproducing a sound field 100 of the site A using the plurality of speakers 2B which are also disposed in the site B.

By presenting the sound field 100 of the place together with an image of the place in which the user 0 wishes to be immersed to the user, a sense of immersion in the place can be further heightened for the user 0.

Note that, although the display device 3 has been exemplified to have only one surface as a display surface in FIG. 1, it is desirable to dispose a display device 3 which has at least five display surfaces on the front, left, right, top, and bottom as shown in FIG. 2 to heighten a sense of immersion.

Here, in an actual system, a place to be reproduced as the site A can be selected from a plurality of candidates.

Designation of a place to be reproduced is performed by, for example, the user 0. For example, an arbitrary position is designated from a map image displayed on the display device 3 when a service provided in the present system is enjoyed. A place which corresponds to the position is specified from position information of the designated position, and then the place is reproduced through an image and a sound as described above.

Here, the plurality of speakers 2B in the side B shown in FIG. 1 form a space to surround the user 0.

As will be described later, a space which is formed by being surrounded by a plurality of microphones is also present in addition to the space surrounded by the plurality of speakers as described above in the present embodiment.

In the present specification, the interface of a space which is formed by being surrounded by a plurality of speakers or microphones as described above, in other words, the interface of a space which is formed by connecting the plurality of speakers or microphones to each other, is referred to as an "acoustic closed surface," or simply as a "closed surface."

As shown in FIG. 1, the acoustic closed surface that is formed by the plurality of speakers 2B in the site B is denoted by a closed surface 1B.

Note that a microphone may be referred to simply as a mic in the following description.

2. Techniques for Sound Field Reproduction

In the present embodiment, the sound field of the site A is reproduced in the site B as described above; however, as specific techniques of the sound field reproduction, two techniques shown in FIG. 3 (Technique 1 and Technique 2) are mainly proposed in the present embodiment.

First, in Technique 1, the sound field 100, in which a sound produced by the user 0 who is inside the closed surface 1B in the site B (for example, a voice that the user 0 produces, an impact sound that is produced when an object is dropped, a sound that is produced when utensils touch during a meal, or the like) is sensed as if it echoes in the site A, is reproduced by a plurality of speakers 2B. As will be described later in detail, in order to realize Technique 1, sounds produced by the user 0 are collected by a plurality of mics 5B which are disposed to surround the user 0 and processed with a corresponding transfer function, and thereby an acoustic signal for sound field reproduction (an acoustic signal to be output by the speakers 2B) is generated.

Here, as in general "echolocation," an approximate space structure can be understood empirically through auditory perception and recognition of how a sound one has produced oneself travels. Thus, according to the sound field reproduction of Technique 1 described above, the user 0 can perceive an impression of a space not only with an image but also with an acoustic factor that is based on a sound he or she has produced. As a result, a sense of immersion can thereby be increased.

In addition, in Technique 2, the user 0 who is inside the closed surface 1B is caused to perceive an environmental sound of the site A that is a reproduction target including an echo of the sound in the site A.

Here, when the closed surface 1B is assumed to be inside the site A and a sound is set to be emitted from a given position outside the closed surface 1B inside the site A, there are also cases in which the sound is accompanied with a component of a reflective sound or a reverberant sound that is made via a structural object or an obstacle (such a sound differs depending on a material or structure of each object) present in the site A, in addition to a component that directly reaches the closed surface 1B. In Technique 2, an environmental sound of the site A as well as such an echo sound is perceived.

By implementing Technique 2 together with Technique 1 described above, a sense of immersion in the site A can be further heightened for the user 0.

3. Measurement Techniques for Sound Field Reproduction (3-1. Overview of Measurement Techniques)

Figure 4:
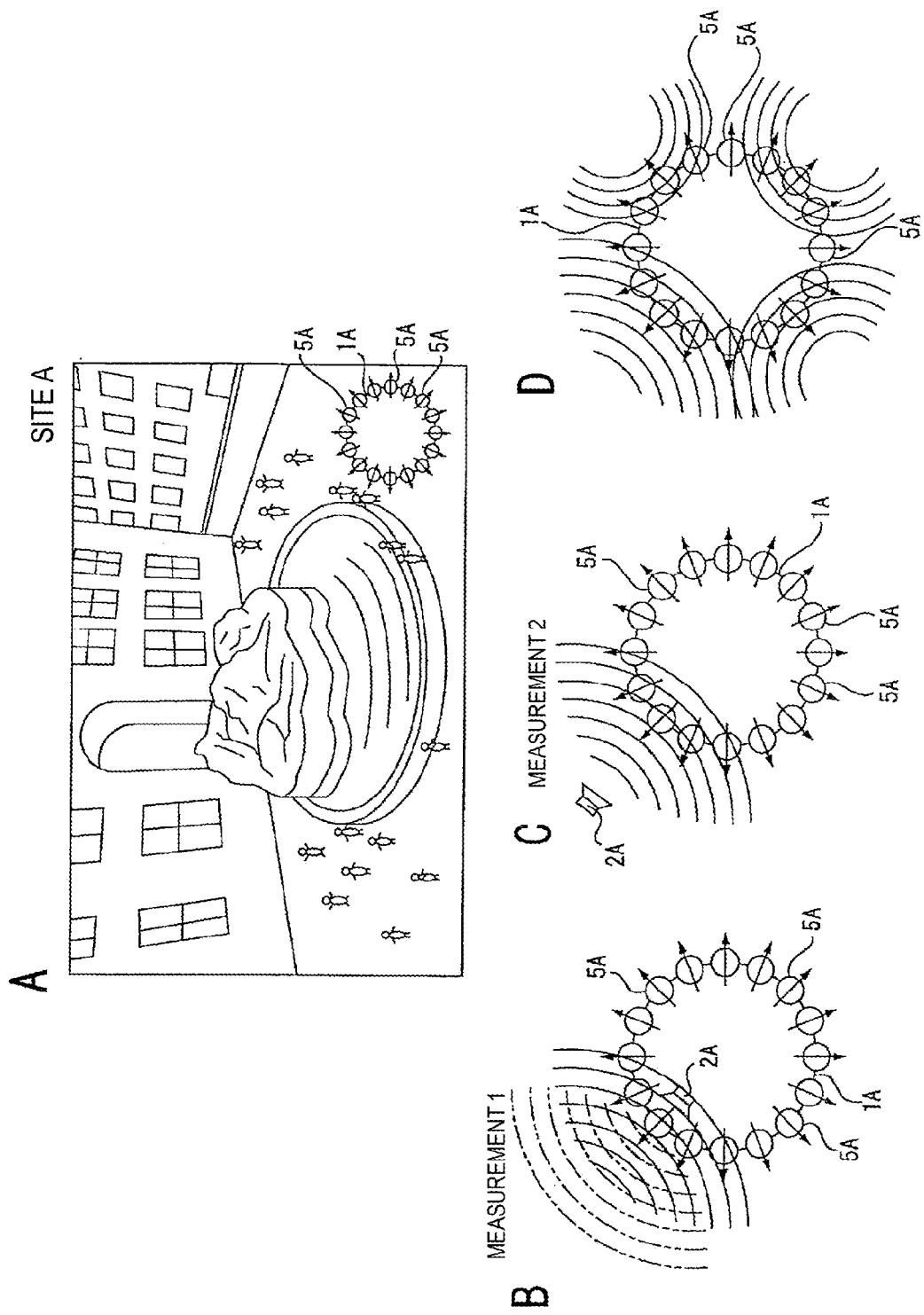
FIG. 4 is a diagram for describing measurement techniques of transfer functions for realizing sound field reproduction of an embodiment.

FIG. 4 is a diagram for describing measurement techniques of transfer functions for realizing sound field reproduction of an embodiment.

FIG. 4A schematically shows a plurality of mics 5A which are disposed inside the site A for measurement.

FIG. 4B schematically shows a measurement technique which corresponds to Technique 1 (which is denoted as Measurement 1), and FIG. 4C schematically shows a measurement technique which corresponds to Technique 2 (which is denoted as Measurement 2). FIG. 4D schematically shows a technique for recording an environmental sound of the site A without change using the plurality of mics 5A which are disposed in the site A.

Here, as shown in FIG. 4A, the interface of a space surrounded by the plurality of mics 5A which are disposed in the site A for measurement is referred to as a closed surface 1A. It is ideal to set this closed surface 1A to have the same size and shape as the closed surface 1B of the site B in which the user 0 is present. Moreover, it is desirable to set the mics 5A on the closed surface 1A to have the same conditions as the speakers 2B on the closed surface 1B in number and positional relations.

First, in Measurement 1 shown in FIG. 4B, a transfer function to be used when a sound that the user 0 who is inside the closed surface 1B has produced is processed in Technique 1 shown in FIG. 3 is measured.

Specifically in Measurement 1, a transfer function (impulse response) that indicates how a sound (a signal for measurement) outwardly emitted from the speakers 2A for measurement which are disposed in the site A is affected by an echo in the site A and then reaches each of the mics 5A which are also disposed in the site A is measured.

Thus, by processing the signal (the sound produced by the user 0) collected by the mics 5B of the site B using the transfer function and outputting the signal from the speakers 2B, the sound field 100 in which the sound produced by the user 0 is sensed as if it were echoing in the site A can be constructed in the site B.

Note that, although the example of the drawing shows that measurement is performed by disposing the speakers 2A for measurement inside the closed surface 1A on which the plurality of mics 5A are disposed, the example corresponds to a case in which the plurality of speakers 2B for reproduction (on the closed surface 1B) are disposed inside the plurality of mics 5B which collect the sound produced by the user 0 (on a closed surface 4B) in the site B as a reproduction environment. As will be described later, the positional relation of the closed surface 1B and the closed surface 4B can be reversed, and in such a case, the speakers 2A for measurement are disposed outside the closed surface 1A in Measurement 1 (refer to FIG. 5 and the like).

On the other hand, in Measurement 2 shown in FIG. 4C which corresponds to Technique 2 above, a transfer function to be used to process an acoustic signal that is based on a sound source that must be localized at an arbitrary position outside the closed surface 1B is measured.

Here, Technique 2 described above can be realized by collecting environmental sounds of the site A using the plurality of mics 5A which are disposed in the site A as shown in FIG. 4D and outputting a signal of the sound collection from each of the speakers 2B at positions which correspond to those on the closed surface 1B in the simplest way (particularly when the speakers 2A disposed in the site B and the mics 5A disposed in the site A are set to be the same in number and positional relations).

In a case in which the environmental sounds which are simply recorded as described above are set to flow, however, when two or more kinds of environmental sounds are to be reproduced in one site, there is a problem that recording must be performed a plurality of times in that site, or the like.

Thus, in the present embodiment, the concept of so-called "object-based audio" is employed to realize Technique 2.

Here, the "object-based audio" will be briefly described.

In order to realize sound quality and a sound field, a producer generally provides a completed package of sound recorded on an existing medium, for example, a compact disc (CD), a digital versatile disc (DVD) for each channel, and an acoustic signal of each channel accommodated in each package is played to correspond to a channel of a corresponding speaker.

In recent years, however, an idea of "object-based audio (or sound field expression)" in which a sound field, sound quality, and the like that a producer intends for people to hear are considered to have overlaps of a plurality of sets of "meta information" of an "acoustic stream signal of each sound source" and "the movement and position of the sound source" (which is referred to tentatively as an object), and the realization (rendering) according to a replay environment is entrusted to a replay environment side has appeared.

Using the object-based technique described above, a sound field and sound quality can be reproduced in accordance with features and performance of a replay environment catering to the intentions of a producer not only in the current state in which diversification of replay environments continues to progress but also when performance of a replay environment improves by leaps and bounds in the future.

Note that, as renderers to realize the "rendering" described above, there are various kinds of renderers according to replay environments from a renderer for a headphone to a sound field renderer using a number of speakers for a 22.2 channel system or an immersive environment. Note that, as the sound field renderer for an immersive environment, a plurality of techniques have been currently proposed, and various techniques such as wave field synthesis (WFS), a boundary surface control principle (BoSC), a technique obtained by simplifying Kirchhoff's integral theorem (JP 4775487B, JP 4674505B, and the like) and the like are known.

Measurement 2 shown in FIG. 4C is a measurement of a transfer function for causing the user 0 to perceive a sound in a way that, when the object-based sound field reproduction technique described above is employed, a sound source that is to be localized at an arbitrary position outside the closed surface 1B is localized at the position and the sound emitted from the position is perceived in the form of being affected by an echo in the site A.

Specifically, in Measurement 2, a transfer function which indicates how a sound (a signal for measurement), which is emitted from the speakers 2A for measurement which are disposed at arbitrary positions outside the closed surface 1A on which the plurality of mics 5A are disposed, reaches each of the mics 5A including influence of echo in the site A (impulse response) is measured.

Here, in the present embodiment, sound field reproduction using the transfer functions which are measured in Measurement 1 and Measurement 2 are set to be realized based on the following idea.

In other words, when a wave surface on which a sound that will reach the closed surface 1B intersects the closed surface 1B is assumed, the plurality of speakers 2B perform replay so that the assumed wave surface is created inside the closed surface 1B.

(3-2. Regarding Measurement 1)

Hereinbelow, a specific example of the transfer function measurement technique of Measurement 1 will be described with reference to FIGS. 5 to 7.

Figure 5:
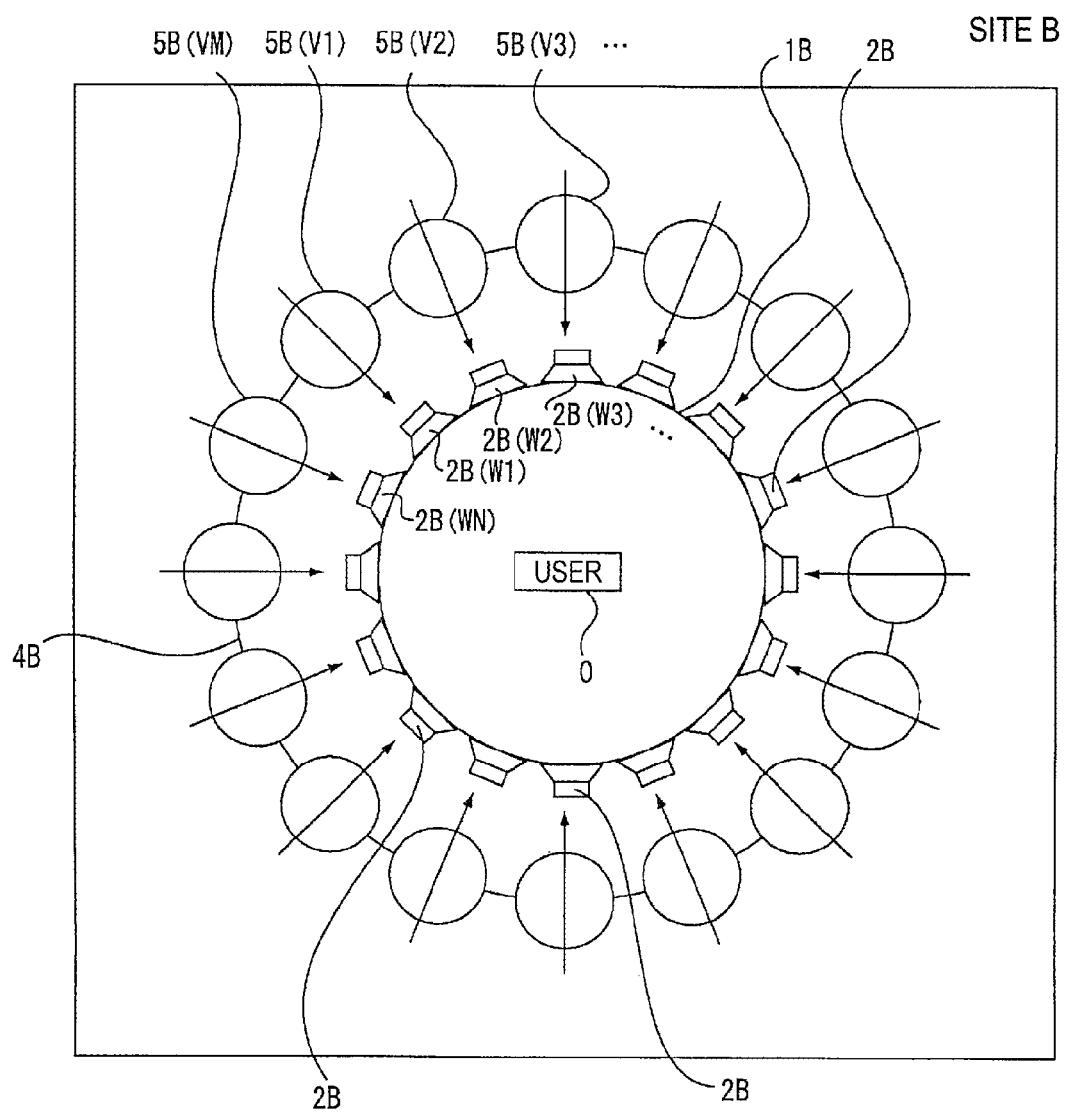
FIG. 5 is a diagram showing a plurality of speakers disposed in a reproduction environment and their closed surfaces and a plurality of microphones and their closed surfaces.

First, FIG. 5 shows the plurality of speakers 2B disposed in the site B (reproduction environment) in which the user 0 is present and the closed surface 1B and the plurality of mics 5B and the closed surface 4B. As understood from description above, the mics 5B disposed in the site B are provided to collect sounds produced by the user 0 in real time.

In this case, the mics 5B must have inward directivity (in an inward direction of the closed surface 4B) to realize a system in which a sound produced by the user 0 who is inside the closed surface 4B is affected by echo in the site A and output from the speakers 2B. To this end, directional microphones are used as each of the mics 5B, and are installed so that directions of directivity thereof face the inward direction of the closed surface 4B.

In addition, the speakers 2B are installed so that directions of sound emission thereof face the inward direction of the closed surface 1B. In other words, directional speakers are used as the speakers 2B, and directivity thereof is set to be inward.

Note that it is desirable to set a direction of directivity at that time to be perpendicular to the closed surface.

Here, in description below, the number of speakers 2B which are disposed in the site B is set to N, and the number of mics 5B which are disposed in the site B is set to M. As shown in the drawing, the mics 5B are set to be disposed at each of positions of V1, V2, V3, . . . , and VM on the closed surface 4B, and the speakers 2B are set to be disposed at each of positions of W1, W2, W3, . . . , and WN on the closed surface 1B.

Note that the mics 5B which are disposed at each of the positions described above may be denoted hereinbelow as mics V1, V2, V3, . . . , and VM corresponding to the respective disposition positions thereof. Likewise, the speakers 2B may be denoted as speakers W1, W2, W3, . . . , and WN corresponding to the respective disposition positions thereof.

Figure 6:
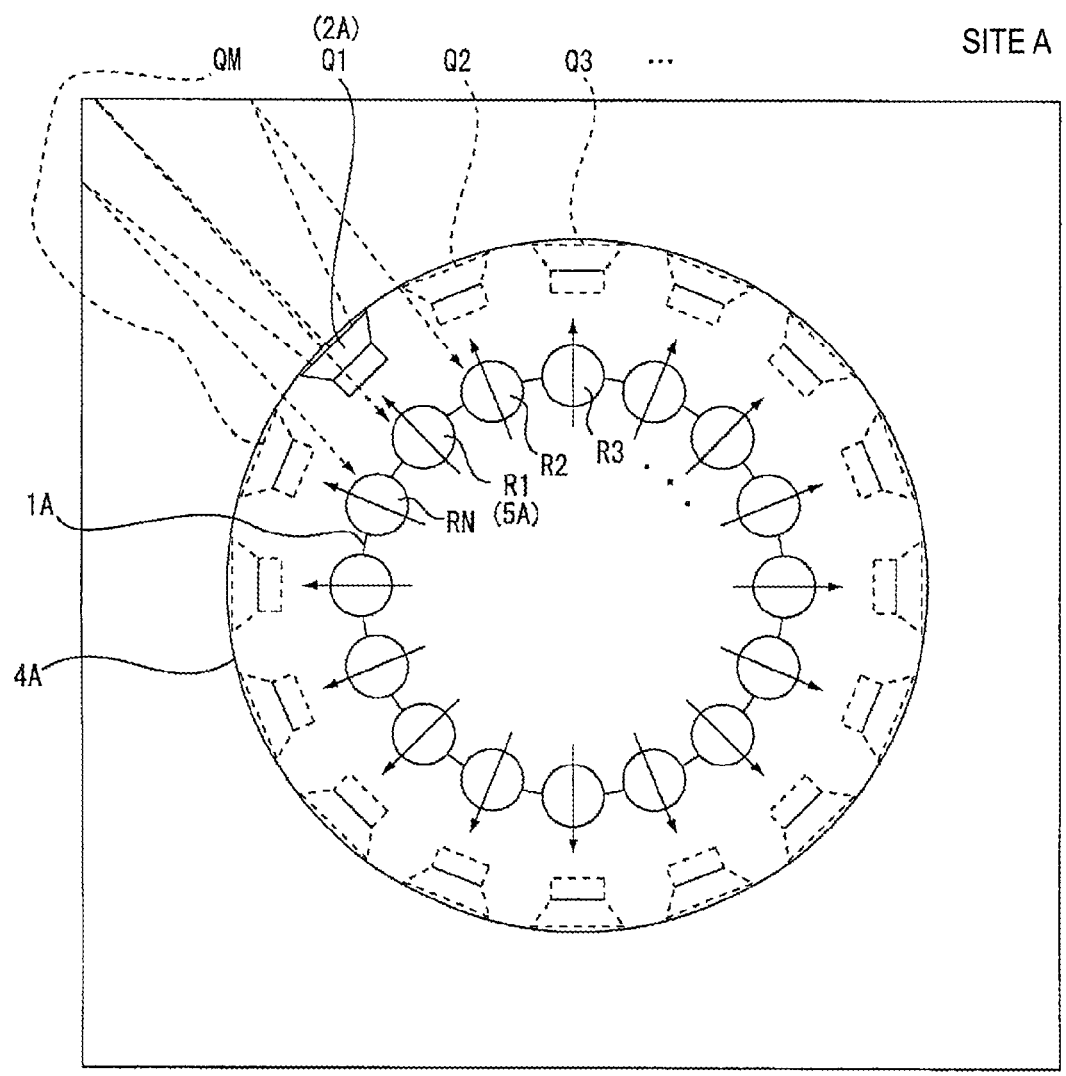
FIG. 6 is an illustrative diagram regarding a specific technique for measuring a transfer function as Measurement 1.
Figure 7:
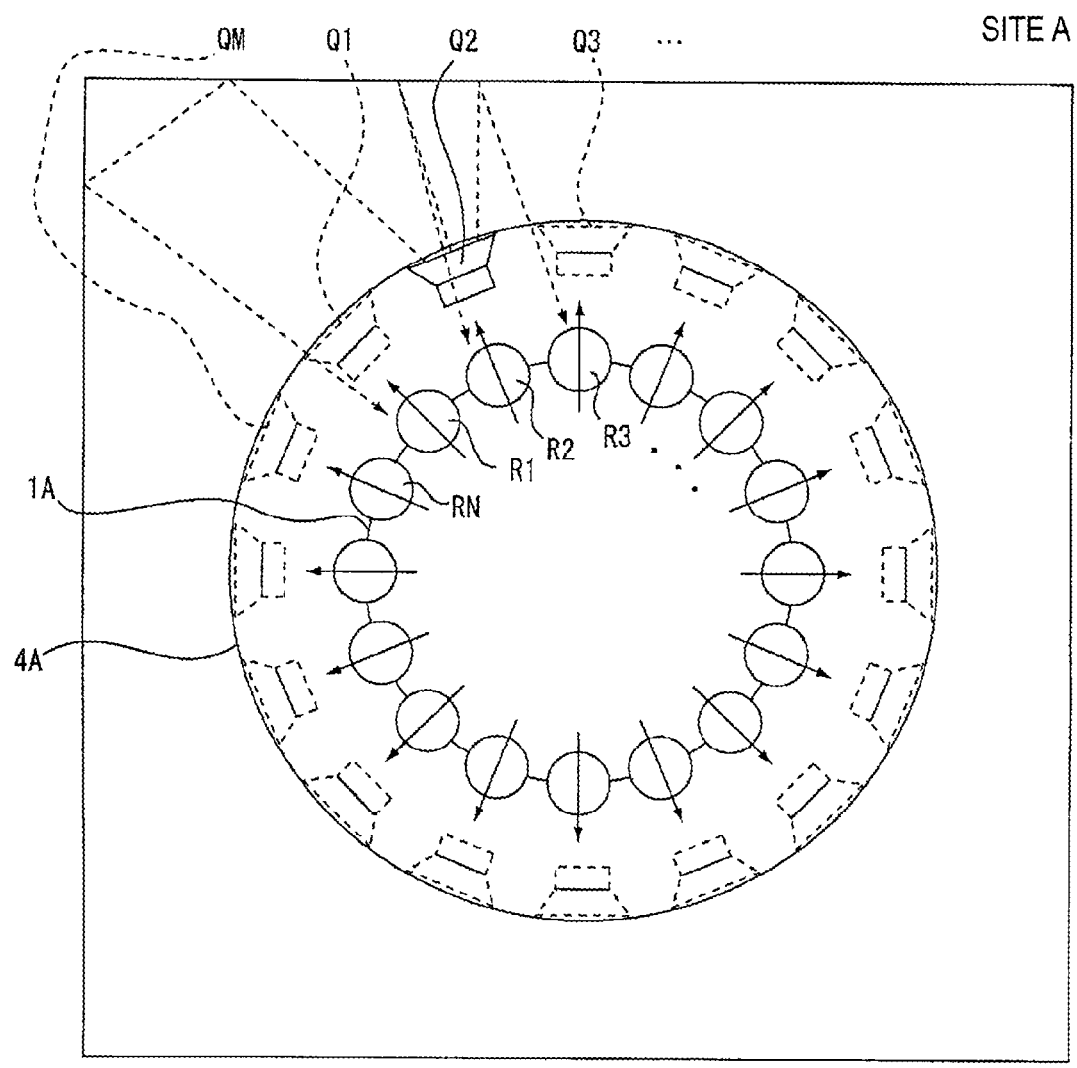
FIG. 7 is also an illustrative diagram regarding the specific technique for measuring a transfer function as Measurement 1.

FIGS. 6 and 7 are illustrative diagrams regarding the specific transfer function measurement technique of Measurement 1.

In FIGS. 6 and 7, the plurality of speakers 2A, the closed surface 1A, the plurality of mics 5A and a closed surface 4A of the site A (measurement environment) are shown.

As seen from the drawings, the number of disposition positions of the speakers 2A on the closed surface 4A of the site A is set to M in description herein. The disposition positions are denoted by Q1, Q2, Q3, . . . , and QM as shown in the drawings.

In addition, the number of mics 5A which are disposed on the closed surface 1A of the site A is set to N, and the disposition positions thereof are denoted by R1, R2, R3, . . . , and RN as shown in the drawings.

Note that the speakers 2A disposed in each of the positions described above may also be denoted as speakers Q1, Q2, Q3, . . . , and QM corresponding to the respective disposition positions thereof and the mics 5A may also be denoted as mics R1, R2, R3, . . . , and RN corresponding to the respective disposition positions thereof in the site A.

Here, with respect to the speakers 2A and the mics 5A of the site A, the speakers 2A and the mics 5A must have outward directivity for the purpose of obtaining a transfer function for causing the user 0 to perceive a sound that the user 0 has produced and that is affected by an echo in the site A. Due to this point, the speakers 2A are set to have outward directivity by using directional speakers, and the mics 5A are also set to have outward directivity as shown in the drawing by using directional microphones. It is also desirable in this case to set the direction of the directivity to be perpendicular to the closed surface.

Here, for the purpose of convenience of the present description, the closed surface 4A of the site A is set to have the same size and shape as the closed surface 4B of the site B, and the positional relation of the respective speakers 2A on the closed surface 4A (an arrangement order and a disposition interval of Q1, Q2, Q3, . . . , and QM) is set to be the same as the positional relation of the respective mics 5B on the closed surface 4B (an arrangement order and a disposition interval of V1, V2, V3, . . . , and VM).

In addition, the closed surface 1A of the site A is set to have the same size and shape as the closed surface 1B of the site B, and the positional relation of the respective mics 5A on the closed surface 1A (an arrangement order and a disposition interval of R1, R2, R3, . . . , and RN) is set to be the same as the positional relation of the respective speakers 2B on the closed surface 1B (an arrangement order and a disposition interval of W1, W2, W3, . . . , and WN).

Based on the premises described above, in Measurement 1, measurement sounds are sequentially output from the speakers 2A of each of the positions (Q1 to QM) on the closed surface 4A, and respective transfer functions from the speakers 2A which have output the measurement sounds to the positions of the respective mics 5A (R1 to RN) on the closed surface 1A are sequentially obtained.

In FIG. 6, a state in which a measurement sound is output from the speaker 2A at the position of Q1 and the measurement sound affected in reflection or the like in the site A is collected by the respective mics 5A of R1 to RN is shown.

Based on the sound collection signal of the respective mics 5A obtained as described above, N transfer functions from the speaker 2A at the position of Q1 to the respective mics 5A of R1 to RN can be obtained.

In the present example herein, a sound that is based on a time stretched pulse (TSP; swept sine also has the same meaning) signal is output as the measurement sound described above, and an impulse response is measured from the sound collection signal. Data of the impulse response is a transfer function that indicates how a sound output from a given speaker 2A is affected by an echo of the site A and then reaches a given mic 5A.

In addition, in FIG. 7, a state in which a measurement sound is output from the speaker 2A at the position of Q2 and the measurement sound which has been affected by reflection on the site A or the like is collected by the respective mics 5A of R1 to RN is shown.

Based on the sound collection signal of the respective mics 5A obtained in this way, impulse responses from the speaker 2A at the position of Q2 to the respective mics 5A of R1 to RN are measured. Accordingly, N transfer functions from the speaker 2A at the position of Q2 to the respective mics 5A of R1 to RN can be obtained.

Measurement of the transfer functions based on the sound collection signal of the respective mics 5A of R1 to RN described above is executed to the position of QM by sequentially changing the speakers 2A which output the measurement sound. Accordingly, as the transfer functions, a total of M×N transfer functions including N transfer functions from the speaker 2A of Q1 to each of the mics 5A of R1 to RN (which are denoted by $QR_{11}$ to $QR_{1N}$), N transfer functions from the speaker 2A of Q2 to each of the mics 5A of R1 to RN (which are denoted by $QR_{21}$ to $QR_{2N}$), ..., and N transfer functions from the speaker 2A of QM to each of the mics 5A of R1 to RN (which are denoted by $QR_{M1}$ to $QR_{MN}$) can be obtained.

The M×N transfer functions can be expressed in a matrix as shown by Expression 1 below.

[Math 1]

$$\begin{pmatrix} QR_{11} & QR_{21} & \cdots & QR_{M1} \\ QR_{12} & & & QR_{M2} \\ \vdots & & & \vdots \\ QR_{1N} & \cdots & & QR_{MN} \end{pmatrix} \quad [\text{Expression 1}]$$

Note that, in obtaining the M×N transfer functions, the measurement sound may be sequentially output at each position of Q1 to QM, and the number of speakers 2A necessary for the output may be a minimum of 1. In other words, by sequentially disposing one speaker 2A at each position of Q1, Q2, Q3, . . . , and QM and causing the speaker to emit the sound, measurement necessary for obtaining the M×N transfer functions can be performed.

Moving the speaker 2A for each measurement, however, is cumbersome, and thus in the present example, measurement of the M×N transfer functions is set to be performed by disposing the speakers 2A at each position of Q1 to QM and sequentially selecting speakers 2A which output the measurement sound from the speakers 2A.

Here, a transfer function which is measured in Measurement 1 indicating how a sound produced by the user 0 is affected by an echo in the site A and transferred is also referred to as a first transfer function.

Figure 8:
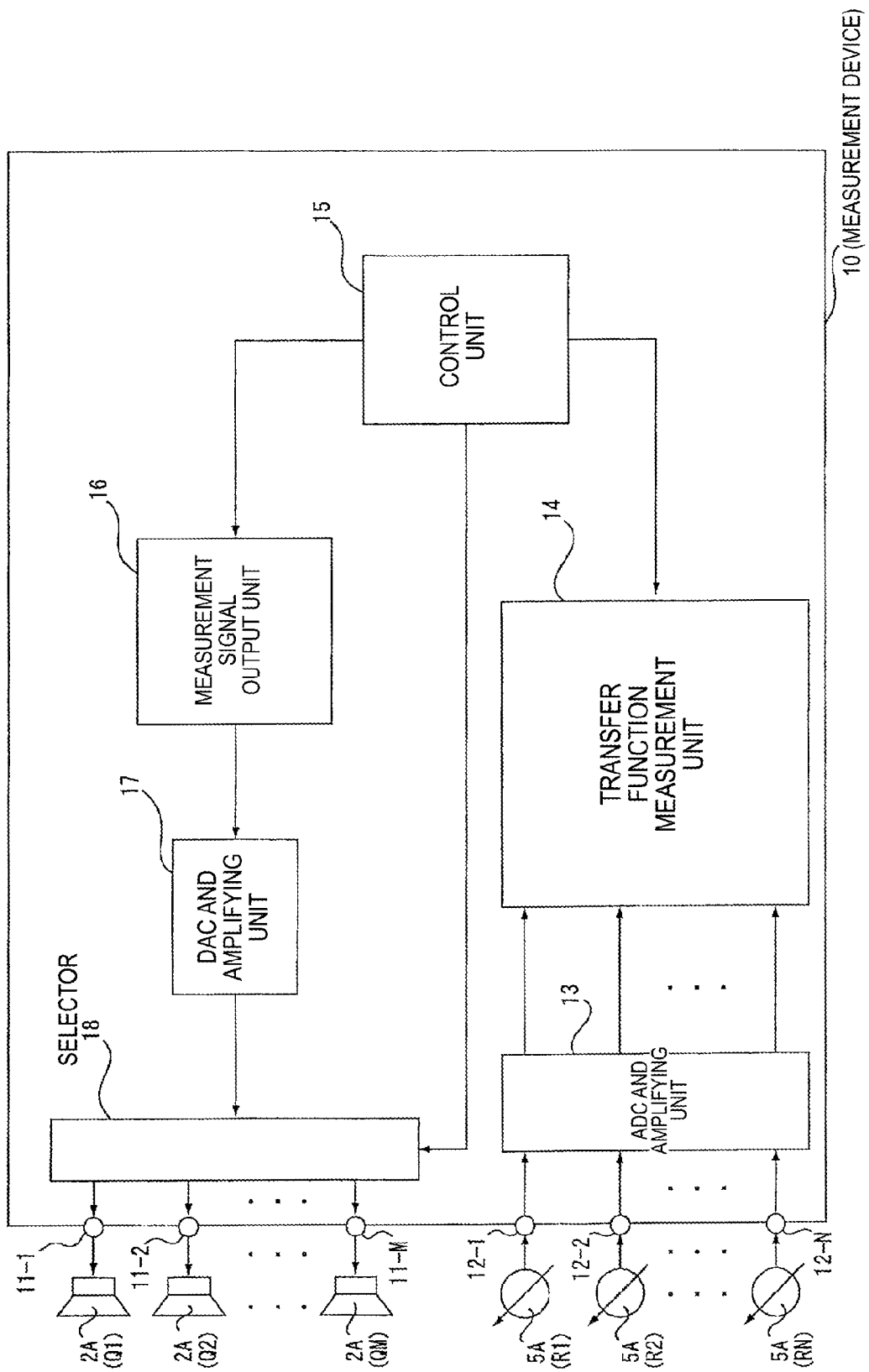
FIG. 8 is an illustrative diagram regarding a system configuration for performing measurement of a transfer function.

FIG. 8 is an illustrative diagram regarding a system configuration for performing measurement of a transfer function of Measurement 1 described above.

As shown in FIG. 8, M speakers 2A, N mics 5A, and a measurement device 10 are provided to realize Measurement 1.

In the measurement device 10, M terminal units 11 (11-1 to 11-M) to connect the M speakers 2A to the device and N terminal units 12 (12-1 to 12-N) to connect the N mics 5A thereto are provided.

In addition, inside the measurement device 10, an A-D converter (ADC) and amplifying unit 13, a transfer function measurement unit 14, a control unit 15, a measurement signal output unit 16, a D-A converter (DAC) and amplifying unit 17, and a selector 18 are provided.

The measurement signal output unit 16 outputs a TSP signal as a measurement signal to the DAC and amplifying unit 17 based on control of the control unit 15. The DAC and amplifying unit 17 D-A-converts and amplifies the input measurement signal and then outputs the signal to the selector 18.

The selector 18 selects one terminal unit 11 (i.e., a speaker 2A) which is instructed by the control unit 15 among the terminal units 11-1 to 11-M and then outputs the measurement signal input from the DAC and amplifying unit 17 thereto.

The ADC and amplifying unit 13 amplifies and A-D-converts a sound collection signal received from each mic 5A and input from each terminal unit 12 and then outputs the signal to the transfer function measurement unit 14.

The transfer function measurement unit 14 performs measurement of an impulse response (transfer function) based on the sound collection signal received from each mic 5A and input from the ADC and amplifying unit 13 according to an instruction from the control unit 15.

The control unit 15 is configured as, for example, a micro-computer provided with a central processing unit (CPU), a read only memory (ROM), and a random access memory (RAM), and performs overall control of the measurement device 10 by executing processes according to programs stored in the ROM and the like.

Particularly, the control unit 15 of this case performs control over the measurement signal output unit 16, the selector 18, and the transfer function measurement unit 14 so that a measurement operation of Measurement 1 described above is realized. To be specific, the control unit controls the measurement signal output unit 16 and the selector 18 so that sound emission is sequentially performed by the respective speakers 2A of Q1, Q2, Q3, . . . , and QM, based on the measurement signal, and controls measurement timings of the transfer function measurement unit 14 so that measurement of the transfer functions is performed based on the sound collection signal of each mic 5A in synchronization with timings of sound emission by each speaker 2A.

Accordingly, measurement of the M×N transfer functions described above is realized.

Figure 9:
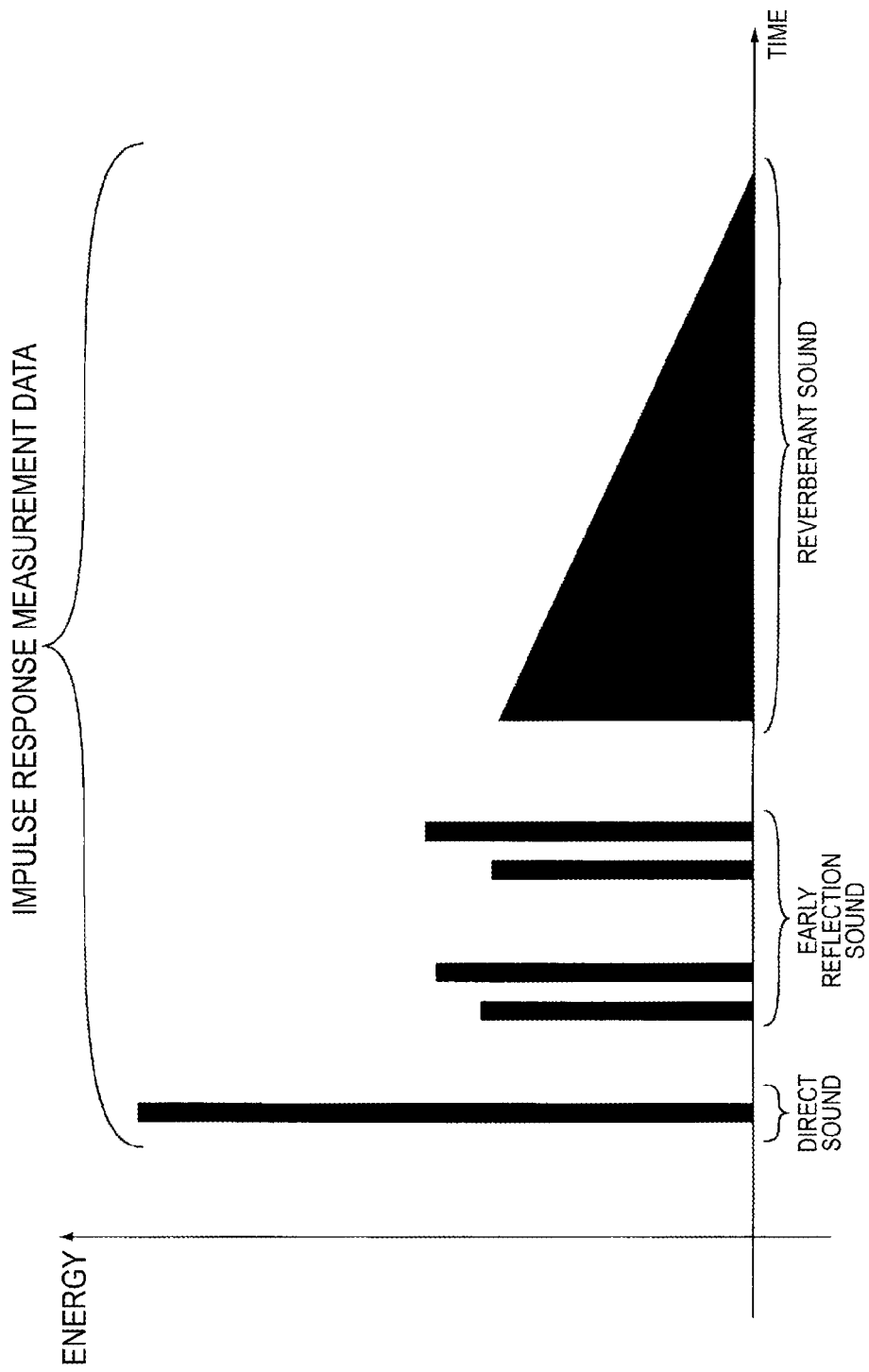
FIG. 9 is a diagram showing an example of impulse response measurement data.

Here, in a practical perspective, an impulse response which is expression of a time axis of a transfer function includes a direct sound or an early reflection sound in addition to a reverberant sound component as shown in FIG. 9 due to directivity of the speakers and mics, which is also likely to be an obstructive factor in producing a sense of presence depending on cases.

Note for the sake of clarification that a direct sound is a sound which is emitted from a speaker 2A and directly reaches a mic 5A (without going through reflection on the site A).

Thus, in the present example, a measured impulse response is decomposed into components of a direct sound, an early reflection sound, and a reverberant sound on the time axis, and balance of the components is changed and then synthesized again.

Figure 10:
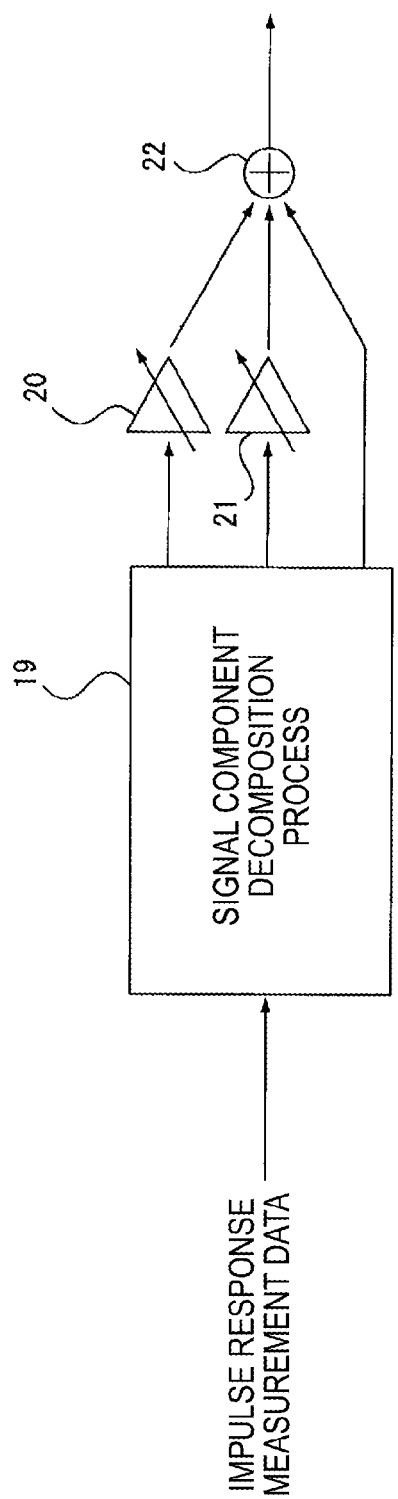
FIG. 10 is an illustrative diagram regarding a configuration for suppressing adverse influence derived from components other than reverberant sound components (direct sounds or early reflection sounds).

A configuration for the process is shown in FIG. 10.

Impulse response measurement data in the drawing is data of an impulse response (time axis waveform data) measured based on a sound collection signal by a mic 5A.

This impulse response measurement data is decomposed into a direct sound, an early reflection sound, and a reverberant sound on the time axis by a signal component decomposition processing unit 19 as shown in the drawing.

With regard to the direct sound and the early reflection sound, multiplication units 20 and 21 change balance of the sounds respectively (adjust levels). The components of the direct sound and the early reflection sound whose balance has been adjusted in this way and the component of the reverberant sound obtained by the signal component decomposition processing unit 19 are added together by an addition unit 22.

The transfer functions used in the present example are set to be obtained by performing component decomposition and balance adjustment described above on the measured (raw) impulse response data.

(3-3. Regarding Measurement 2)

Figure 11:
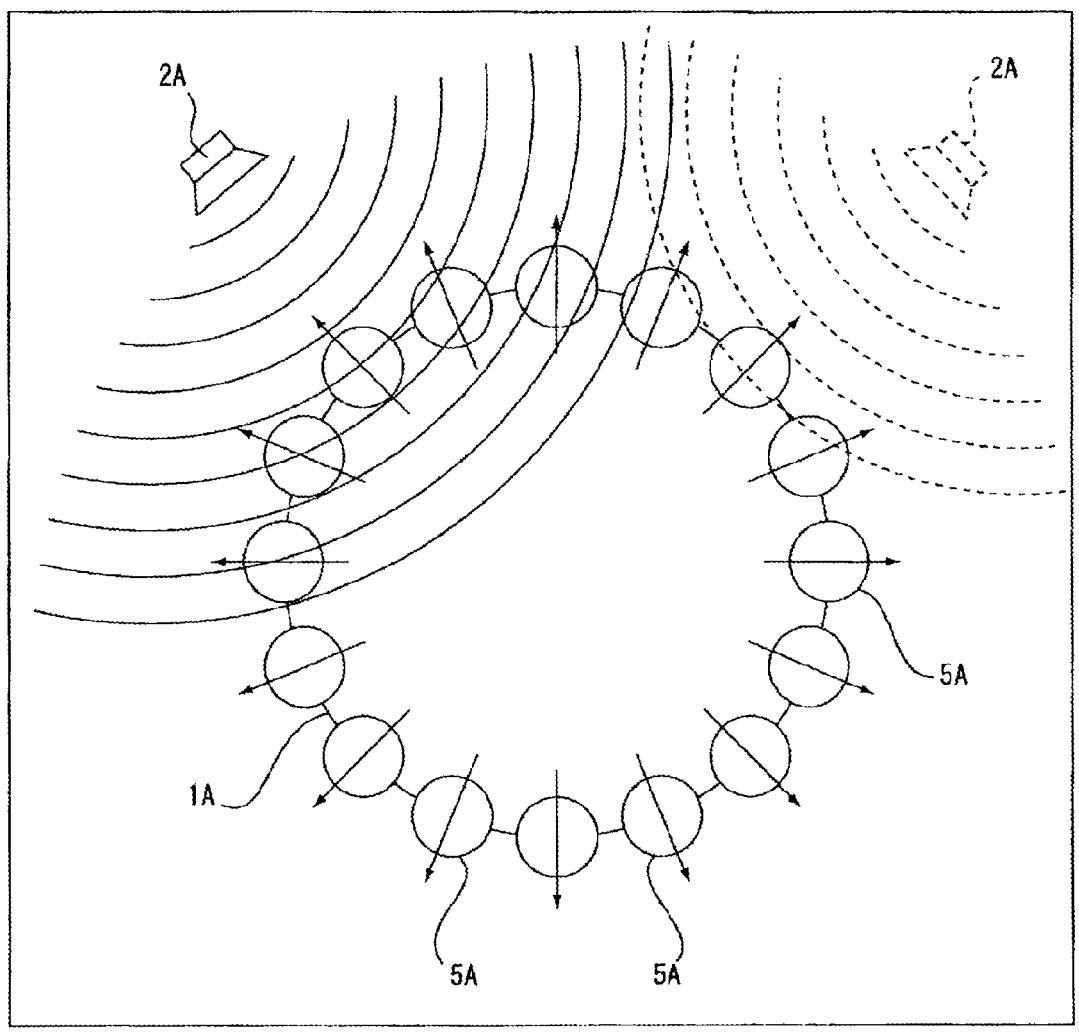
FIG. 11 is an illustrative diagram regarding a specific technique for measuring a transfer function as Measurement 2.

FIG. 11 is an illustrative diagram regarding a specific technique for measuring a transfer function of Measurement 2.

Measurement 2 described above involves localizing a sound source that must be localized at an arbitrary position outside the closed surface 1B at the position and then measuring transfer functions (impulse responses) each indicating how a sound emitted from a speaker 2A for measurement which is disposed at an arbitrary position outside the closed surface 1A so that a sound emitted from the position is set to be perceived by the user 0 in the form of an echo in the site A reaches each of the mics 5A including influence of echo in the site A.

Specifically, in Measurement 2, the speaker 2A is disposed at the position at which the sound source to be reproduced is desired to be localized in the site A, a measurement sound output from the speaker 2A is collected by each of the mics 5A on the closed surface 1A, and then respective impulse responses are measured. Accordingly, the sound source can be localized at the position at which the speaker 2A are disposed and a group of transfer functions for causing a sound based on the sound source to be perceived as a sound which is affected by an echo in the site A can be obtained.

Here, when there are a plurality of positions at which the sound source is desired to be localized, the same measurement of the transfer functions is performed at the plurality of positions in the site A. For example, after transfer functions are measured by performing sound emission of a measurement sound at the position of the speaker 2A indicated by the solid line in FIG. 11 and sound collection by each of the mics 5A, transfer functions are measured by performing sound emission of a measurement sound at the position of the speaker 2A indicated by the dashed line and sound collection by each of the mics 5A.

When there are a plurality of "positions at which the sound source is desired to be localized" as described above, measurement of transfer functions is performed for each of the "positions at which the sound source is desired to be localized."

Here, a transfer function which is measured in Measurement 2 indicating how a sound emitted from an arbitrary position outside the closed surface 1A reaches the closed surface 1A side also including influence of an echo in the site A is also referred to hereinafter as a second transfer function.

Note for the sake of clarification that, in Measurement 2, a transfer function that also can express directivity of a sound source can be obtained according to a direction in which a speaker 2A which emits a measurement sound faces the closed surface 1A.

Measurement 2 described above can also be realized using the measurement device 10 shown in FIG. 8 above.

In this case, however, the number of connected speakers 2A is the number according to the number of positions at which the sound source is desired to be localized. Specifically, when speakers 2A are connected in the same number as positions at which the sound source is desired to be localized, the control unit 15 controls the selector 18 to sequentially select the speakers 2A which will output measurement sounds and controls the transfer function measurement unit 14 to execute a transfer function measurement process in synchronization with the output timings of the measurement sounds.

4. Sound Field Reproduction Based on Transfer Functions (4-1. Sound Field Reproduction Based on a First Transfer Function)

As described above, the number of the first transfer functions is a total of M×N including N transfer functions from the speaker 2A of Q1 to each of the mics 5A of R1 to RN ($QR_{ii}$ to $QR_{1N}$), N transfer functions from the speaker 2A of Q2 to each of the mics 5A of R1 to RN ($QR_{21}$ to $QR_{2N}$), . . . , and N transfer functions from the speaker 2A of QM to each of the mics 5A of R1 to RN ($QR_{M1}$ to $QR_{MN}$).

Here, it is ascertained that, in the site B (reproduction environment) shown in FIG. 5, the number of speakers 2B which are disposed on the closed surface 1B is N, and thus the number of channels of acoustic signals that must be finally obtained is N.

When an acoustic signal that must be output from the position of W1 is considered on the above premise, for example, a sound which is emitted from the user 0 in each of directions of V1 to VM on the closed surface 4B, affected by an echo in the site A, and returns to the position of W1 must be output from the position of W1.

In other words, when an acoustic signal to be output from the speaker 2B at the position of W1 is set to a signal $W_1$, the signal $W_1$ can be expressed as follows.

$$W_1 = V_1 \times QR_{11} + V_2 \times QR_{21} + V_3 \times QR_{31} + \ldots + V_M \times QR_{M1}$$

In the above formula, however, $V_1$ to $V_M$ are set to be sound collection signals of mics V1 to VM.

As the signal $W_1$ above, M signals obtained by processing respective sounds output in each of the directions of V1 to VM (Q1 to QM) with one corresponding transfer function among transfer functions ($QR_{11}$, $QR_{21}$, . . . , and $QR_{M1}$) of W1 (R1) are summated.

Likewise for the positions of W2 and W3, sounds which are emitted from the user 0 in each of the directions of V1 to VM, affected by an echo in the site A, and then return to the positions of W2 and W3 must be output, and signals $W_2$ and $W_3$ which must be output from the speakers 2B at the positions of W2 and W3 can be expressed as follows.

$$W_2 = V_1 \times QR_{12} + V_2 \times QR_{22} + V_3 \times QR_{32} + \ldots + V_M \times QR_{M2}$$

$$W_3 = V_1 \times QR_{13} + V_2 \times QR_{23} + _3 \times QR_{33} + \ldots + V_M \times QR_{M3}$$

In other words, as the signal $W_2$, M signals which are obtained by processing the respective sounds output in each of the directions of V1 to VM (Q1 to QM) with one corresponding transfer function among transfer functions ($QR_{12}$, $QR_{22}$, . . . , and $QR_{M2}$) of W2 (R2) are summated, and as the signal $W_3$, M signals which are obtained by processing the respective sounds output in each of the directions of V1 to VM (Q1 to QM) with one corresponding transfer function among transfer functions ($QR_{13}$, $QR_{23}$, . . . , and $QR_{M3}$) of W3 (R3) are summated.

The same applies when obtaining other signals $W_4$ to $W_N$.

Based on the above description, the following Expression 2 is obtained when an arithmetic expression of the signals W1 to WN is expressed as a matrix.

[Math 2]

$$\begin{pmatrix} W_1 \\ W_2 \\ \vdots \\ W_N \end{pmatrix} = \begin{pmatrix} QR_{11} & QR_{21} & \cdots & QR_{M1} \\ QR_{12} & & & QR_{M2} \\ \vdots & & & \vdots \\ QR_{1N} & \cdots & & QR_{MN} \end{pmatrix} \begin{pmatrix} V_1 \\ V_2 \\ \vdots \\ V_M \end{pmatrix}$$ [Expression 2]

When the arithmetic operation expressed by Expression 2 is performed, the signals $W_1$ to $W_N$ which must be output from each of the speakers 2B of W1 to WN to cause the user 0 to perceive a sound field that is sensed as if a sound produced by the user 0 in the closed surface 1B were echoing in the site A can be obtained.

(4-2. Sound Field Reproduction Based on a Second Transfer Function)

As understood from above description, Technique 2 that uses the second transfer function causes the user 0 to perceive an environmental sound of the site A also including echoes in the site A, but unlike Technique 1, a process on a sound collection signal of the mics 5B using a transfer function is not performed.

In Technique 2, a process is performed on a predetermined sound source that is recorded in advance using a second transfer function, not on a sound collection signal of the mics 5B.

Specifically, in Technique 2, by performing a process on a predetermined sound source using N second transfer functions which are measured for the disposition position of one speaker 2A in Measurement 2 described above, signals which must be output from each speaker 2B disposed in the site B as a reproduction environment are obtained.

As a simplest example, when one given sound source is localized at one given position, for example, N signals are obtained by processing acoustic signals that are based on the sound source with the second transfer functions which are measured based on sound collection signals of each position of R1 to RN, and the signals may be output from one corresponding speaker 2B among the speakers 2B of W1 to WN in the reproduction environment.

Alternatively, when a sound source A is localized at a position a and a sound source B is localized at a position b, N signals are obtained for the sound source A by processing acoustic signals which are based on the sound source A with N second transfer functions which have been obtained in measurement at the position a, and N signals are obtained for the sound source B by processing acoustic signals which are based on the sound source B with N second transfer functions which have been obtained in measurement at the position b. Then, the N signals obtained on each of the sound source A and the sound source B sides are added to each of the positions (W1 to WN) of the speakers 2B, and thereby signals which must be output from the speakers 2B at each of the positions of W1 to WN are obtained.

5. Configuration of a Signal Processing System

Figure 12:
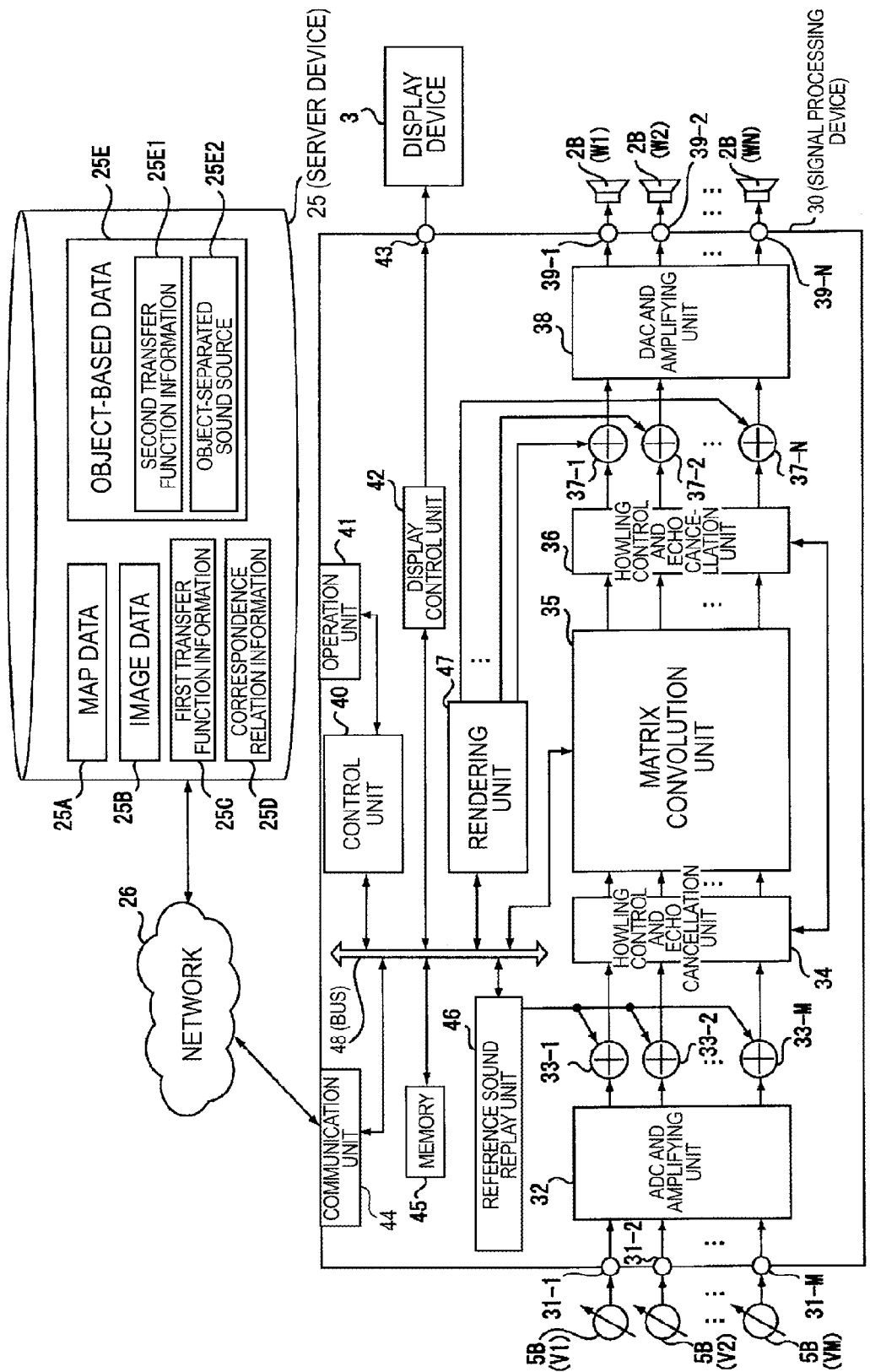
FIG. 12 is a diagram for describing a configuration of a signal processing system for realizing a signal processing technique as an embodiment.

FIG. 12 is a diagram for describing a configuration of a signal processing system for realizing a signal processing technique as an embodiment described above.

As shown in FIG. 12, the signal processing system according to the present embodiment is configured to have at least M mics 5B, a signal processing device 30, N speakers 2B, a display device 3, and a server device 25.

First, as a premise, data regarding map information that must be displayed for designation of position information by the user 0, image data that must be displayed corresponding to a place specified from designated position information, information of first transfer functions to be used in sound field reproduction of Technique 1, and object-based data to be used in sound field reproduction of Technique 2 are assumed to be stored in the server device 25.

Specifically, the server device 25 stores map data 25A, image data 25B, first transfer function information 25C, correspondence relation information 25D, and object-based data 25E.

The map data 25A is data supplied for display of the map information (map images). In addition, the image data 25B is image data for places which are reproduction targets, and for example, image data obtained by photographing figures of the places for each reproduction target place.

In addition, the first transfer function information 25C represents information of first transfer functions measured for each of reproduction target places in Measurement 1 described above.

In addition, the object-based data 25E comprehensively represents object-based data used in sound field reproduction of Technique 2. As this object-based data 25E, second transfer function information 25E1 which is information of second transfer functions measured for each of reproduction target places in Measurement 2 above and object-separated sound source 25E2 are included.

The object-separated sound source 25E2 is a sound source present in a reproduction target place, and it may be considered as, for example, a necessary sound source extracted from a recorded signal at a reproduction target place. As a process of extracting this sound source, noise removal, reverberation suppression, or the like is performed on the recorded signal. Accordingly, sound source data which has a favorable S/N (noise-to-noise ratio) and also a suppressed reverberation feeling can be obtained. In other words, sound source data proper for object-based sound field reproduction can be obtained.

The correspondence relation information 25D is information to display an image of a place according to designated position information and to realize operations of the present system of realizing a sound field corresponding to the place, and specifically, information in which a place, an image to be displayed corresponding to the place, a first transfer function to be used in sound field reproduction of Technique 1 corresponding to the place, an object-separated sound source (object sound source in the drawing) to be used in sound field reproduction of Technique 2 corresponding to the place, and second transfer functions are associated together as shown in FIG. 13.

In the present example, the image data, the first transfer functions, the second transfer functions, and the object-separated sound sources are managed with respective IDs.

In the correspondence relation information 25D, IDs for the image data, first transfer functions, second transfer functions, and object-separated sound sources that must be used corresponding to the places are described, and with the IDs, actual data to be used in practice can be specified from actual data stored as the image data 25B, the first transfer function information 25C, the second transfer function information 25E1, and the object-separated sound source 25E2.

Note that, in the correspondence relation information 25D shown in the drawing, with regard to data to be used in sound field reproduction of Technique 2, two each of object-separated sound sources and second transfer functions are associated with one place; however, this corresponds to a technique for localizing two respective sound sources at different positions in one place.

Returning to FIG. 12, the signal processing device 30 is provided with a communication unit 44, and can perform data communication with the server device 25 using the communication unit 44 via a network 26, for example, the Internet.

The signal processing device 30 is provided with M terminal units 31 (31-1 to 31-M) to connect M mics 5B to the device and N terminal units 39 (39-1 to 39-N) to connect N speakers 2B thereto.

In addition, the signal processing device 30 is also provided with a terminal unit 43 to connect the display device 3 also shown in FIG. 1 above.

Further, inside the signal processing device 30, an ADC and amplifying unit 32, addition units 33-1 to 33-M, howling control and echo cancellation units 34 and 36, a matrix convolution unit 35, addition units 37-1 to 37-N, a DAC and amplifying unit 38, a control unit 40, an operation unit 41, a display control unit 42, the communication unit 44, a memory 45, a reference sound replay unit 46, and a bus 48 are provided.

Here, each of the matrix convolution unit 35, the control unit 40, the display control unit 42, the communication unit 44, the memory 45, the reference sound replay unit 46, and a rendering unit 47 is connected to the bus 48, and thus they can perform data communication with each other via the bus 48.

Inside the signal processing device 30, sound collection signals from each of the mics 5B input through the terminal units 31-1 to 31-M are A-D-converted and amplified by the ADC and amplifying unit 32 for each channel.

The sound collection signals from each of the mics 5B A-D-converted and amplified by the ADC and amplifying unit 32 for each channel are input into respective addition units 33 of corresponding channels among the addition units 33-1 to 33-M.

The addition units 33-1 to 33-M add acoustic signals as reference sounds which have been replayed by the reference sound replay unit 46 to the sound collection signals of each of the channels of V1 to VM, which will be described again later.

The sound collection signals that pass through the addition units 33-1 to 33-M are supplied to the howling control and echo cancellation unit 34.

The howling control and echo cancellation unit 34 is provided to prevent howling caused by feedback, along with the howling control and echo cancellation unit 36 which is provided in the later stage of the matrix convolution unit 35. The howling control and echo cancellation units 34 and 36 are connected to each other so as to perform linked processes as shown in the drawing.

Here, in the present system, the mics 5B and speakers 2B are disposed in a reproduction environment; however, there is concern that an excessive oscillation operation occurs due to an action of both components in some cases because the mics 5B and the speakers 2B are disposed relatively adjacent to each other. Thus, the present example attempts to prevent occurrence of such an excessive oscillation operation by providing the howling control and echo cancellation units 34 and 36.

The matrix convolution unit 35 performs a process on each of signals of which sounds are collected by each of the mics 5B and input via the howling control and echo cancellation unit 34 based on the first transfer functions, and thereby generates signals that must be output from each of the speakers 2B to realize sound field reproduction as Technique 1.

Specifically, the matrix convolution unit 35 performs the process on M signals ($V_1$ to $V_M$) input from the howling control and echo cancellation unit 34 based on the first transfer functions ($QR_{11}$ to $QR_{MN}$) instructed by the control unit 40, and then generates N signals that must be output from each of the speakers 2B to realize sound field reproduction as Technique 1.

Figure 14:
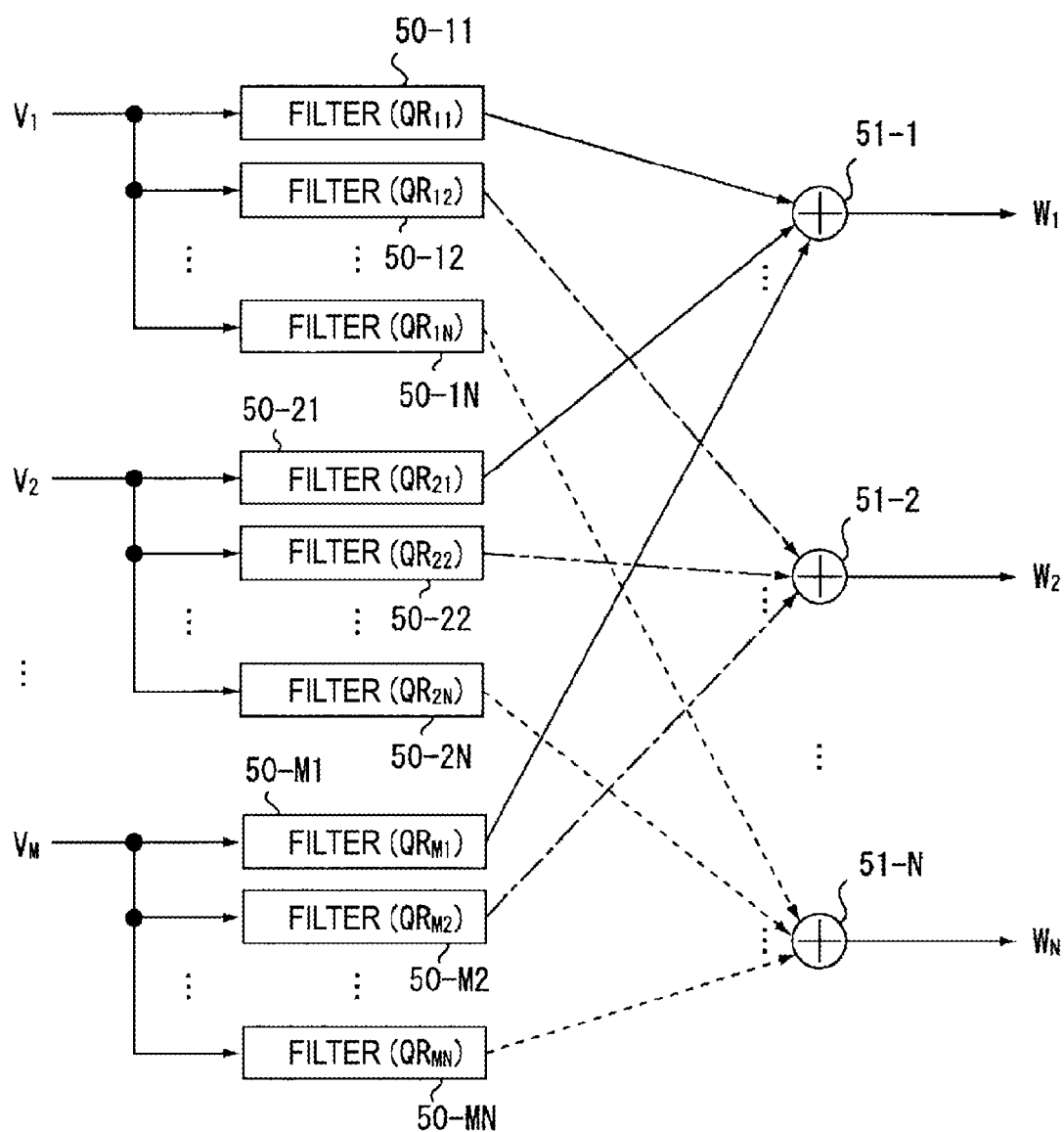
FIG. 14 is a diagram showing a specific internal configuration example of a matrix convolution unit.

Herein, FIG. 14 shows a specific internal configuration example of the matrix convolution unit 35.

Note that this drawing shows a configuration example in which finite impulse response (FIR) digital filters that have expressions of first transfer functions on a time axis (impulse responses) as coefficients are used.

In addition, in this drawing, the signals $V_1$ to $V_M$ are set to indicate signals input to the matrix convolution unit 35 via the howling control and echo cancellation unit 34 as also understood from FIG. 12 above, and the signals $W_1$ to $W_N$ are set to indicate signals input from the matrix convolution unit 35 to the howling control and echo cancellation unit 36.

First, as a premise, filters 50 of this case are assumed to be FIR digital filters.

The matrix convolution unit 35 of this case is provided with N filters 50 (each of which ends with 1 to N) for each of the signals $V_1$ to $V_M$. In this drawing, filters 50-11 to 50-1N to which the signal $V_1$ is input, filters 50-21 to 50-2N to which the signal $V_2$ is input, and filters 50-M1 to 50-MN to which the signal $V_M$ is input are shown as representative examples.

For the filters 50-11 to 50-1N to which the signal $V_1$ is input, a filter coefficient based on the first transfer functions $QR_{11}$ to $QR_{1N}$ corresponding to the position of V1 (Q1) is set.

In addition, for the filters 50-21 to 50-2N to which the signal $V_2$ is input, a filter coefficient based on the first transfer functions $QR_{21}$ to $QR_{2N}$ corresponding to the position of V2 (Q2) is set, and for the filters 50-M1 to 50-MN to which the signal $V_M$ is input, a filter coefficient based on the first transfer functions $QR_{M1}$ to $QR_{MN}$ corresponding to the position of VM (QM) is set.

Although not illustrated in the drawing, filter coefficients based on N first transfer functions corresponding to the positions of the mics 5B which collect sounds of the signals are also set for N filters 50 to which other signals ($V_3$ to $V_{M-1}$) are input.

In addition, the matrix convolution unit 35 is provided with N addition units 51 (51-1 to 51-N). The addition units 51-1 to 51-N receive inputs of signals among signals which have undergone a filter process based on the first transfer function corresponding to each filter 50, and then perform addition to obtain signals $W_1$ to $W_N$.

Specifically, signals obtained from filters 50 which end with 1 among the filters 50 are input to the addition unit 51-1, and signals obtained from filters 50 which end with 2 are input to the addition unit 51-2. In addition, signals obtained from filters 50 which end with N are input to the addition unit 51-N.

In other words, M signals processed with the first transfer functions of the positions according to the numeric values at their ends among the positions of W1 to WN (R1 to RN) are input to the addition units 51-1 to 51-N.

The addition units 51-1 to 51-N add (combine) M signals input as described above.

With the configuration described above, the arithmetic operations of the signals $W_1$ to $W_N$ shown in Expression 2 above can be realized.

Note that, although the example of the time axis arithmetic operation has been shown herein, a convolution operation may be performed as a time axis arithmetic operation. Alternatively, in the case of a frequency operation, multiplication using transfer functions may be performed.

Description will be provided returning to FIG. 12.

The N signals ($W_1$ to $W_N$) obtained in the matrix convolution unit 35 undergoes a process by the howling control and echo cancellation unit 36 for each channel, and then are respectively input to the addition units 37 of corresponding channels among the addition units 37-1 to 37-N.

The addition units 37-1 to 37-N add a signal input from the rendering unit 47 to the signals input from the howling control and echo cancellation unit 36, and then output the signals to the DAC and amplifying unit 38.

The DAC and amplifying unit 38 performs D-A conversion and amplification on the output signals from the addition units 37-1 to 37-N for each channel, and then outputs the signals to the terminal units 39-1 to 39-N. Accordingly, the speakers 2B of W1 to WN of each channel emit sounds according to acoustic signals of corresponding channels.

The rendering unit 47 is provided to perform a signal process for realizing sound field reproduction as Technique 2.

The rendering unit 47 performs a process on an object-separated sound source transmitted from the server device 25 via the network 26 based on second transfer functions which are also transmitted from the server device 25 via the network 26 according to an instruction of the control unit 40, and thereby generates acoustic signals of N channels that must be output from each of the speakers 2B to cause the user 0 to perceive an environmental sound of the site A also including an echo in the site A.

Note that, as understood from the above description, when a plurality of sound sources are localized at different positions, the rendering unit 47 adds the acoustic signals of N channels obtained by processing each of the sound sources with the corresponding (N) second transfer functions for each channel, and thereby obtains acoustic signals of N channels that must be output from each of the speakers 2B.

The display control unit 42 performs display control of the display device 3 which is connected via the terminal unit 43. Specifically, the display control unit 42 of this case causes the display device 3 to display images based on map data transmitted from the server device 25 via the network 26 and images based on image data also transmitted from the server device 25 via the network 26 according to an instruction of the control unit 40.

The memory 45 stores various kinds of data. Particularly, the memory 45 of this case is used to temporarily accumulate (buffer) data transmitted from the server device 25.

The control unit 40 is configured by a micro-computer provided with, for example, a CPU, a ROM, a RAM, and the like, and performs overall control over the signal processing device 30 by executing processes according to programs stored in, for example, the ROM and the like.

The operation unit 41 is connected to the control unit 40, and the control unit 40 realizes operations according to operations by the user 0 by accepting operation information according to operations by the user 0 performed on the operation unit 41 and executing processes according to the operation information.

Figure 15:
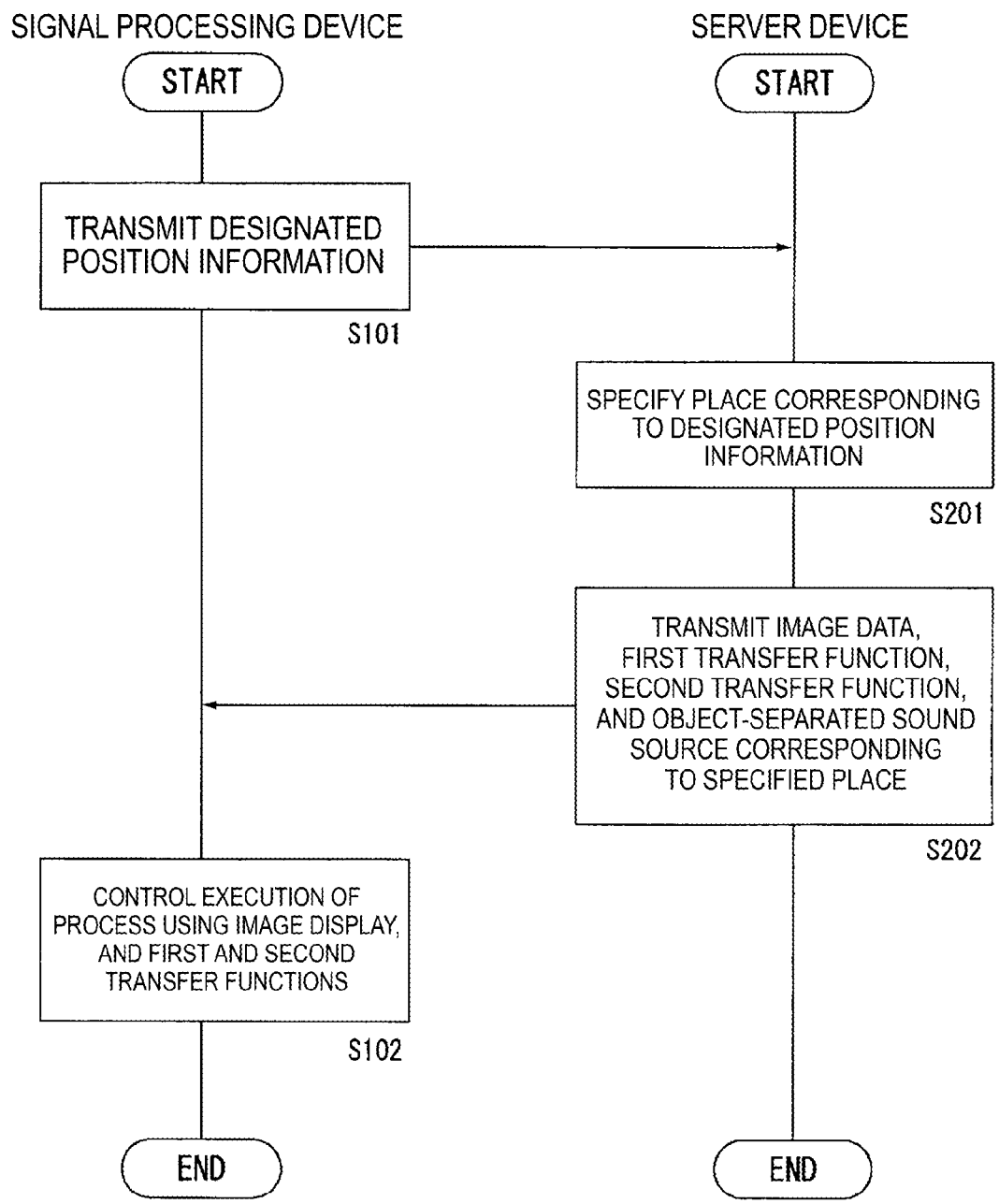
FIG. 15 is a flowchart showing the content of a process to be executed in this system to realize a reproduction operation as an embodiment.

Particularly, the control unit 40 of this case realizes a reproduction operation as an embodiment by executing the process shown next in FIG. 15.

FIG. 15 is a flowchart showing the content of a process to be executed in the present system to realize a reproduction operation as an embodiment.

Note that, in FIG. 15, the process for the signal processing device is executed by the control unit 40 provided in the signal processing device 30, and the process for the server device is executed by a control unit (not illustrated) provided in the server device 25.

In addition, when the processes shown in the drawing are to be started, the devices are assumed to be in the state in which necessary position information has already been designated based on an operation input by the user 0 through the operation unit 41.

In FIG. 15, the control unit 40 of the signal processing device 30 performs a process for transmitting designated position information to the server device 25 in Step S101. In other words, the designated position information is transmitted by the communication unit 44 to the server device 25 via the network 26.

The control unit of the server device 25 specifies a place corresponding to the designated position information in Step S201 according to the reception of the designated position information transmitted from the signal processing device 30 side. The specification of the place is performed with reference to, for example, correspondence relation information between predetermined position information and the place.

After the place is specified in Step S201, the control unit of the server device 25 transmits image data, a first transfer function, a second transfer function, and an object-separated sound source according to the specified place to the signal processing device 30 in Step S202.

Specifically, among imaged data, the first transfer function, the second transfer function, and the object-separated sound source which are stored respectively as the image data 25B, the first transfer function information 25C, the second transfer function information 25E1, and the object-separated sound source 25E2 based on the correspondence relation information 25D, the image data, the first transfer function, the second transfer function, and the object-separated sound source corresponding to the specified place are transmitted to the signal processing device 30.

On the signal processing device 30 side, execution control of a process using image display and the first and second transfer functions is performed in Step S102 according to the transmission of the image data, the first transfer function, the second transfer function, and the object-separated sound source from the server device 25 as described above. In other words, with respect to the image data transmitted from the server device 25 side, an instruction is given to the display control unit 42 to cause the display device 3 to display the image data. In addition, with respect to the first transfer function transmitted from the server device 25 side, an instruction is given to the matrix convolution unit 35 to execute an arithmetic operation of Expression 2 above based on the first transfer function. In addition, with respect to the second transfer function and the object-separated sound source transmitted from the server device 25 side, an instruction is given to the rendering unit 47 to cause the rendering unit 47 to execute a rendering process based on the second transfer function and the object-separated sound source.

Accordingly, an image corresponding to the place specified from the designated position information can be presented to the user 0, a sound field in which a sound emitted by the user 0 is sensed as if it were echoing in the place specified from the designated position information can be provided, and the user 0 can be caused to perceive an environmental sound of the place including an echo sound of the place.

According to the signal processing system of the present embodiment described above, a sense of immersion for the user can be heightened more than when only image information is presented.

Here, as covered above, the reference sound replay unit 46 is provided to output a reference sound in the present embodiment.

As this reference sound, sound data prepared in advance (which may use a collected sound as a source, or may be an artificial sound) is used, rather than a sound recorded in the site B in real time.

It is echolocation like in Technique 1 according to an intention, and it is possible to present the kind of the space of the places using acoustic information by continuously outputting the same sound source material even when reproduction target places are different. In this case, it is possible to understand structures of the places, or the like based on the acoustic information with higher reproducibility than when only sounds that are collected in real time are simply processed with a first transfer function and then output.

As shown in FIG. 12, the reference sound replayed by the reference sound replay unit 46 is added to each of sound collection signals (which have undergone A-D conversion and amplification by the ADC and amplifying unit 32) by the mics 5B by the addition units 33-1 to 33-M.

The matrix convolution unit 35 performs an arithmetic operation using Expression 2 above based on the sound collection signals ($V_1$ to $V_M$) of the respective channels to which the reference sound has been added as described above. Signals of N channels ($W_1$ to $W_N$) obtained in the process by the matrix convolution unit 35 in this way go through the howling control and echo cancellation unit 36, the addition units 37, the DAC and amplifying unit 38, and the terminal units 39, and then are output from the corresponding speakers 2B.

Accordingly, an effect of echolocation is heightened, and thereby a sense of immersion for the user 0 can further increase.

Here, in the above description, the case in which the rendering process for realizing Technique 2 is executed by the signal processing device 30 placed on the reproduction environment side on which the user 0 is present has been exemplified; however, the rendering process can also be set to be performed in a necessary server device on the network 26 (in other words, performed on a so-called cloud) which is isolated from the reproduction environment.

Figure 16:
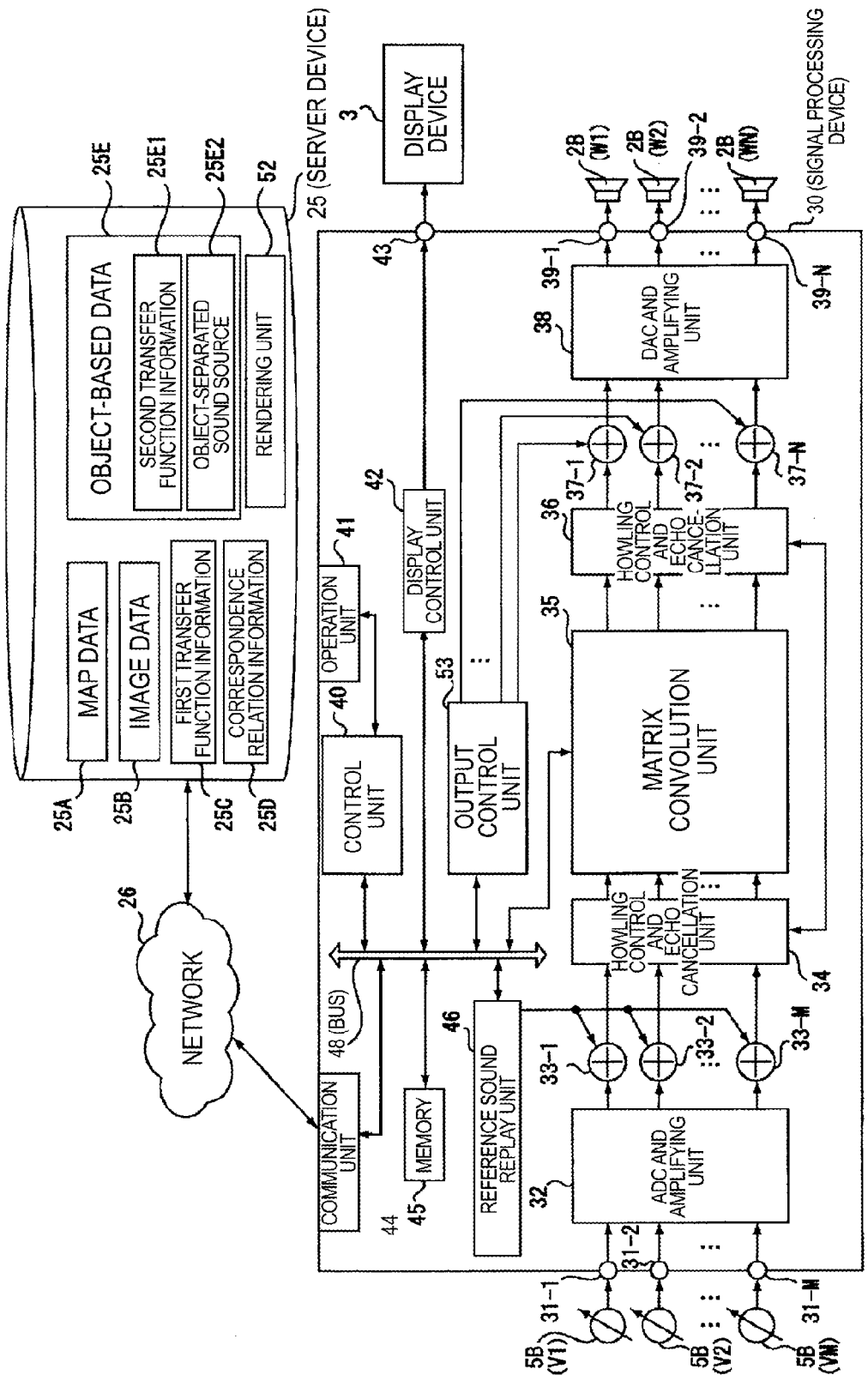
FIG. 16 is a diagram showing a system configuration example in which a rendering process of Technique 2 is set to be performed on a cloud.

FIG. 16 is a diagram showing a system configuration example in which the rendering process of Technique 2 is set to be performed on a cloud.

Note that this drawing shows the configuration example in which the rendering process is performed in the server device 25; however, a server device that stores data such as map data 25A, the first transfer function information 25C, and the like may be formed in a separate body from the server device which executes the rendering process.

As shown in the drawing, the server device 25 is provided with a rendering unit 52 in this case. In addition, the signal processing device 30 is provided with an output control unit 53 instead of the rendering unit 47 in this case.

According to specification of the place based on designated position information, the server device 25 of this case performs a rendering process in the rendering unit 52 using the second transfer function and the object-separated sound source corresponding to the place.

In this case, the server device 25 transmits acoustic signals (of N channels) that has undergone the rendering process by the rendering unit 52 to the signal processing device 30.

The control unit 40 of the signal processing device 30 of this case causes the output control unit 53 to output the respective acoustic signals of N channels transmitted from the server device 25 as described above to the addition units 37 of the corresponding channels out of the addition units 37-1 to 37-N.

When the rendering process is set to be executed on a cloud in this way, a processing burden on the signal processing device 30 can be effectively lightened.

Note that whether the rendering process is to be performed on the signal processing device 30 side (local side) or on the cloud may be appropriately switched according to the speed of the network, a ratio of processing capabilities between the cloud and local side, and the like.

In addition, although all of the first transfer function information 25C and the object-based data 25E is set to be stored in the server device 25 in FIG. 12 above, at least some of the information may be stored on the signal processing device 30 side. In this case, in the signal processing device 30, information of the first transfer function, the object-separated sound source, and the second transfer function of the place specified from the designated position information is acquired from a storage unit inside the signal processing device 30 and used in processes.

6. Modified Examples (6-1. Regarding a Closed Surface)

Here, although not particularly mentioned in the above description, considering the sound field reproduction techniques of the embodiments described above, the closed surface 1B on which the plurality of speakers 2B are disposed in the reproduction environment and the closed surface 4B on which the plurality of mics 5B are also disposed in the reproduction environment may be set to surround the user 0, and the closed surface 1B and the closed surface 4B may intersect each other.

Figure 17:
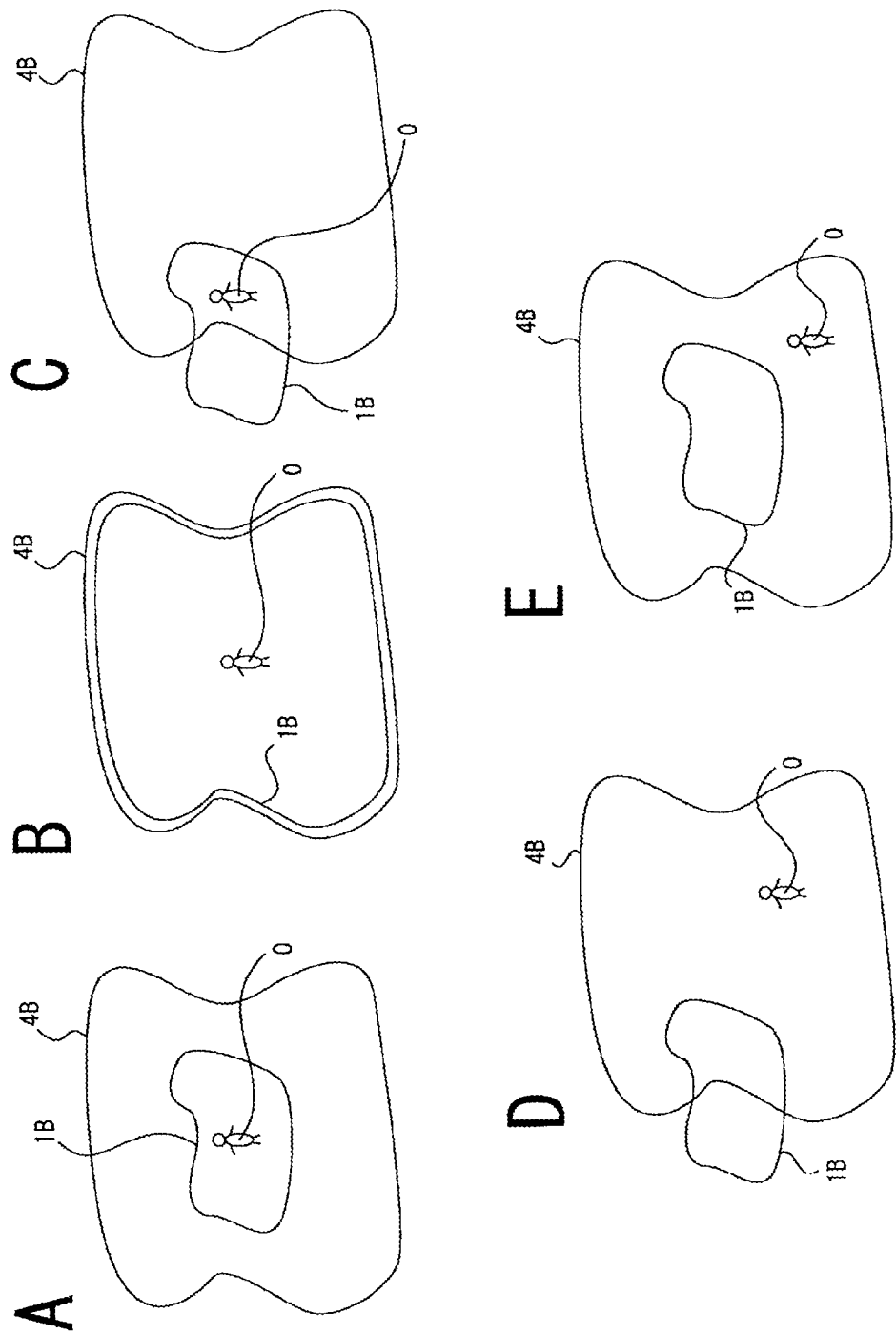
FIG. 17 is a diagram exemplifying relations between a closed surface that is formed through disposition of speakers and a closed surface that is formed through disposition of microphones in a reproduction environment.

FIG. 17 is a diagram exemplifying relations between the closed surface 1B and the closed surface 4B.

FIG. 17A is an example in which the closed surface 1B is set to surround the user 0 and the closed surface 1B is set inside the closed surface 4B. FIG. 17B is an example in which the closed surface 1B is in closer proximity to the closed surface 4B in the example shown in FIG. 17A. In addition, FIG. 17C is an example in which both the closed surface 1B and the closed surface 4B are set to surround the user 0, but a part of the closed surface 1B protrudes from the closed surface 4A.

In addition, in the example shown in FIG. 17D, only the closed surface 4B is set to surround the user 0 in the example of FIG. 17C. In addition, in the example shown in FIG. 17E, the closed surface 1B is set inside the closed surface 4B and the closed surface 4B is set to surround the user 0, but the closed surface 1B is not set to surround the user 0.

Among the examples of FIGS. 17A to 17E, those to which the present technology is properly applied are those shown in FIGS. 17A to 17C.

The closed surface 1B and the closed surface 4B may be set to be formed with at least one region in which their parts overlap, and if the user is present in the overlapping region, the present technology is properly applied.

In addition, a shape of a closed surface formed by mics and speakers is not particularly limited as long as it is a shape that can surround the user 0, and for example, a shape of an elliptic closed surface 1B-1, a cylindrical closed curved shape 1B-2, or a polygonal closed surface 1B-3 as shown in FIG. 18 may be possible.

Note that the shapes of the closed surface 1B formed by the plurality of speakers 2B are exemplified in FIG. 18, and they are also applied to shapes of the closed surface 4B formed by the plurality of mics 5B.

Here, with respect to an ideal disposition interval of the speakers and mics on a closed surface, it is desirable to arrange them at an interval of half a wavelength of a target frequency or lower. However, if this is fully realized, there is also a possibility of the number of speakers and mics to be installed becoming enormous.

In reality, it is desirable to set a realistic number of speakers and mics at which the effect can be experienced.

In addition, the case in which the closed surface 1B is inside the closed surface 4B and the closed surface 4B has a larger size than the closed surface 1B has been exemplified in the above description; however, the closed surface 1B may have a larger size than the closed surface 4B.

Figure 19:
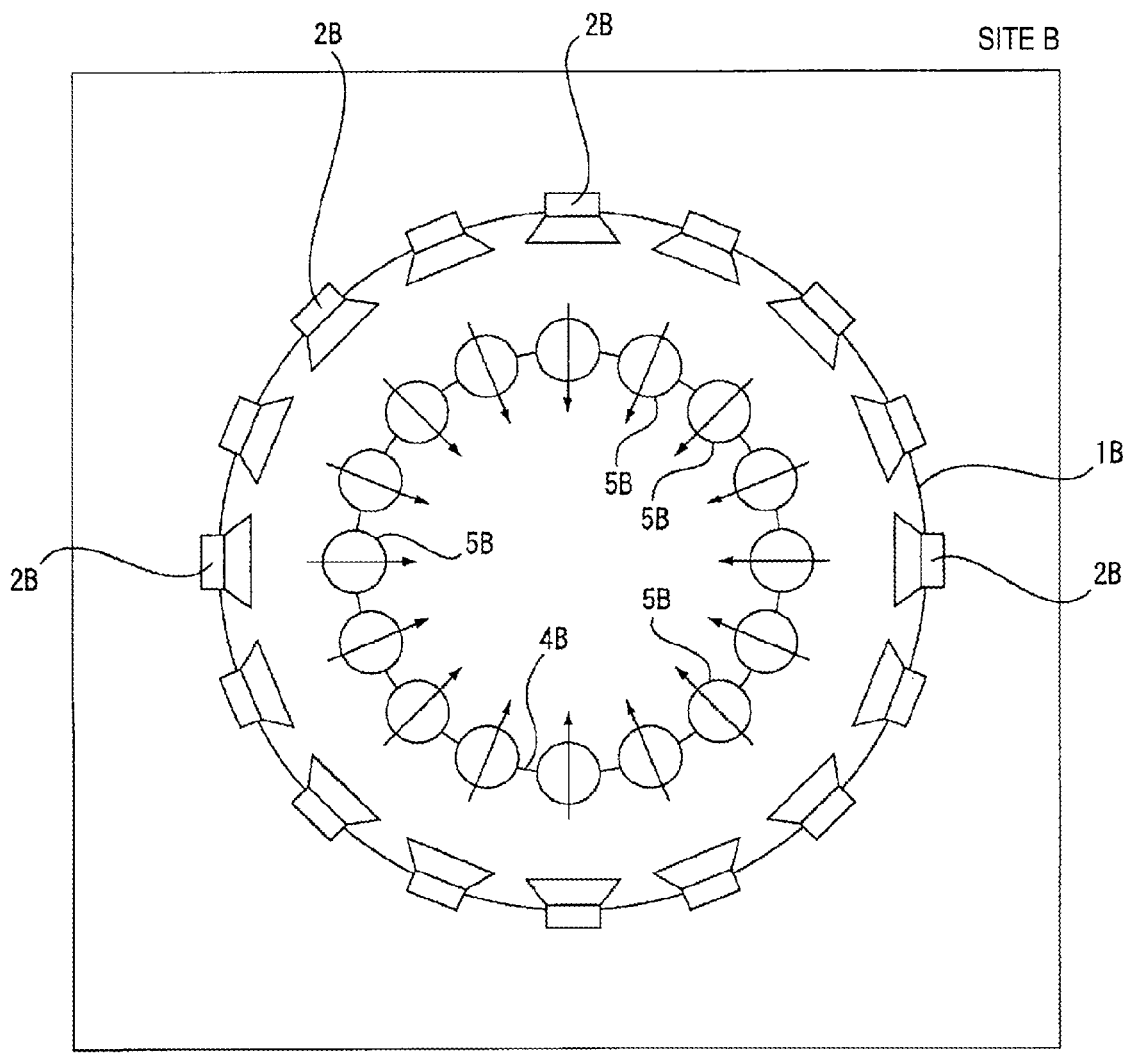
FIG. 19 is a diagram showing a case in which a closed surface formed by arranging microphones is set inside a closed surface formed by arranging speakers in a reproduction environment.

As an example, FIG. 19 shows a case in which the closed surface 4B is set inside the closed surface 1B.

Figure 20:
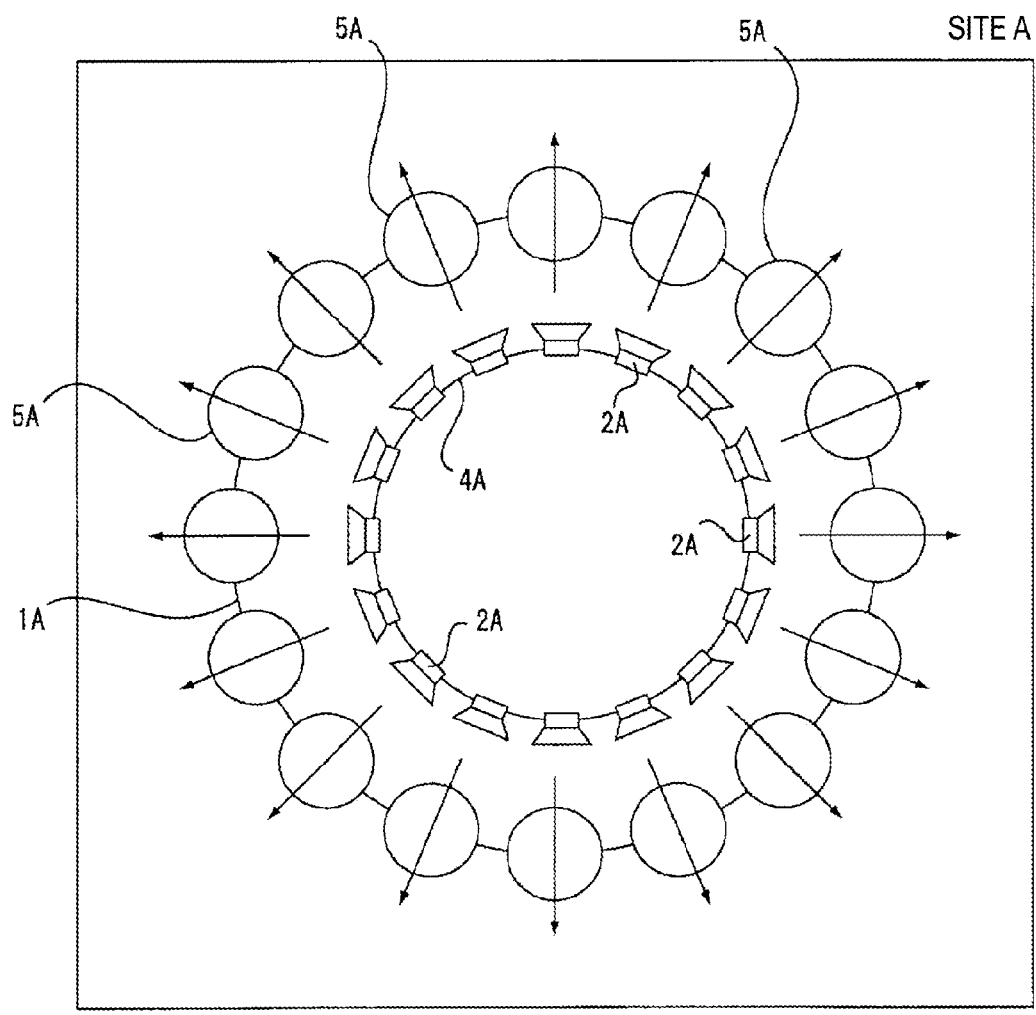
FIG. 20 is a diagram showing a relation between closed surfaces in a measurement environment which corresponds to the case shown in FIG. 19.

When the closed surface 4B is disposed inside the closed surface 1B like this, a closed surface 4A on which speakers 2A are disposed is set inside a closed surface 1A on which mics 5A are disposed in the site A as a measurement environment as shown in FIG. 20.

(6-2. Regarding Directivity)

With respect to the mics 5A and 5B, the case in which the directional mics are used has been exemplified in the above description; however, it is not necessary for the mics 5A and 5B to have directivity as single devices, and omni-directional mics can also be used.

In such a case, by forming a so-called mic array using a plurality of omni-directional mics, an output equivalent to that of directional mics can be obtained.

Figure 21:
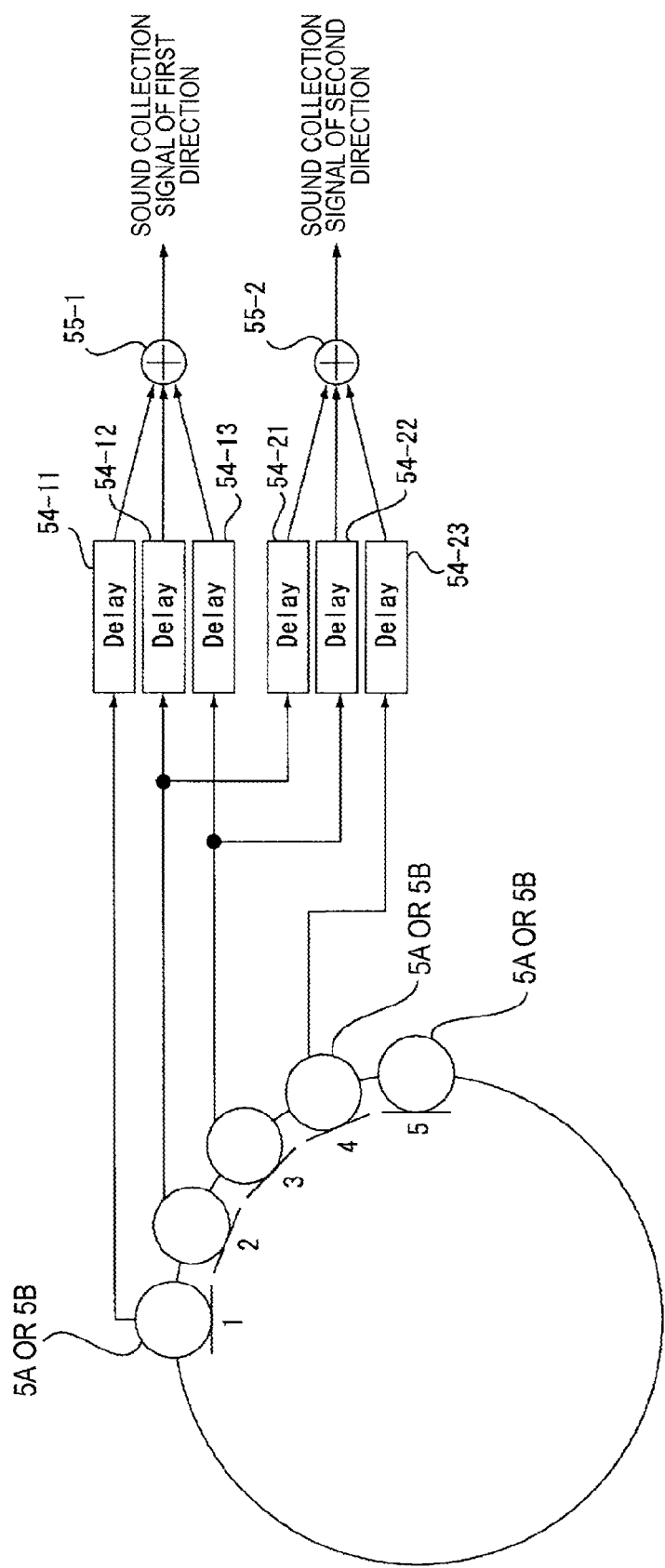
FIG. 21 is a diagram exemplifying a configuration for obtaining an output which is equivalent to that of directional microphones by using omni-directional microphones.

FIG. 21 shows an example of a configuration for obtaining an output which is equivalent to that of directional mics by using omni-directional mics 5A or 5B.

The mics 5A or 5B are set to be disposed at the edge from number 1 to number 5 in the order shown in the drawing. In addition, together with the number 1 to number 5 mics 5A or 5B, two sets of delay circuits, each set having three circuits, are set to be provided in this case (a set of the delay circuits 54-11 to 54-13 and another set of the delay circuits 54-21 to 54-23). Outputs from the delay circuits 54-11 to 54-13 are added by an addition unit 55-1 and outputs from the delay circuits 54-21 to 54-23 are added by an addition unit 55-2 and then output as shown in the drawing.

An output of the number 1 mic 5A or 5B, an output of the number 2 mic 5A or 5B, and an output of the number 3 mic 5A or 5B are input to the delay circuit 54-11, the delay circuit 54-12, and the delay circuit 54-13, respectively. In addition, the output of the number 2 mic 5A or 5B, the output of the number 3 mic 5A or 5B, and an output of the number 4 mic 5A or 5B are input to the delay circuit 54-21, the delay circuit 54-22, and the delay circuit 54-23, respectively.

In the configuration described above, for example, by appropriately setting a delay amount of the delay circuits 54-11 to 54-13, a sound collection signal of a predetermined first direction which can be realized with sound collection signals of the number 1 to number 3 mics 5A or 5B can be obtained as an output of the addition unit 55-1. Likewise, by appropriately setting a delay amount of the delay circuits 54-21 to 54-23, a sound collection signal of a predetermined second direction which can be realized with sound collection signals of the number 2 to number 4 mics 5A or 5B can be obtained as an output of the addition unit 55-2.

By applying appropriate delays to the sound collection signals of the omni-directional mics which are arrayed in plural and adding (combining) them together as described above, a mic array can be formed and an output equivalent to that of directional mics can be obtained.

Note that, although the sound collection signals from the three mics are set to be delayed and added to realize one direction of directivity in the example of FIG. 21, directivity can be expressed when sound collection signals from at least two or more mics are delayed and added.

In addition, for speakers, by forming an array speaker in the same manner, the function of directivity can be realized even when devices themselves are omni-directional.

Figure 22:
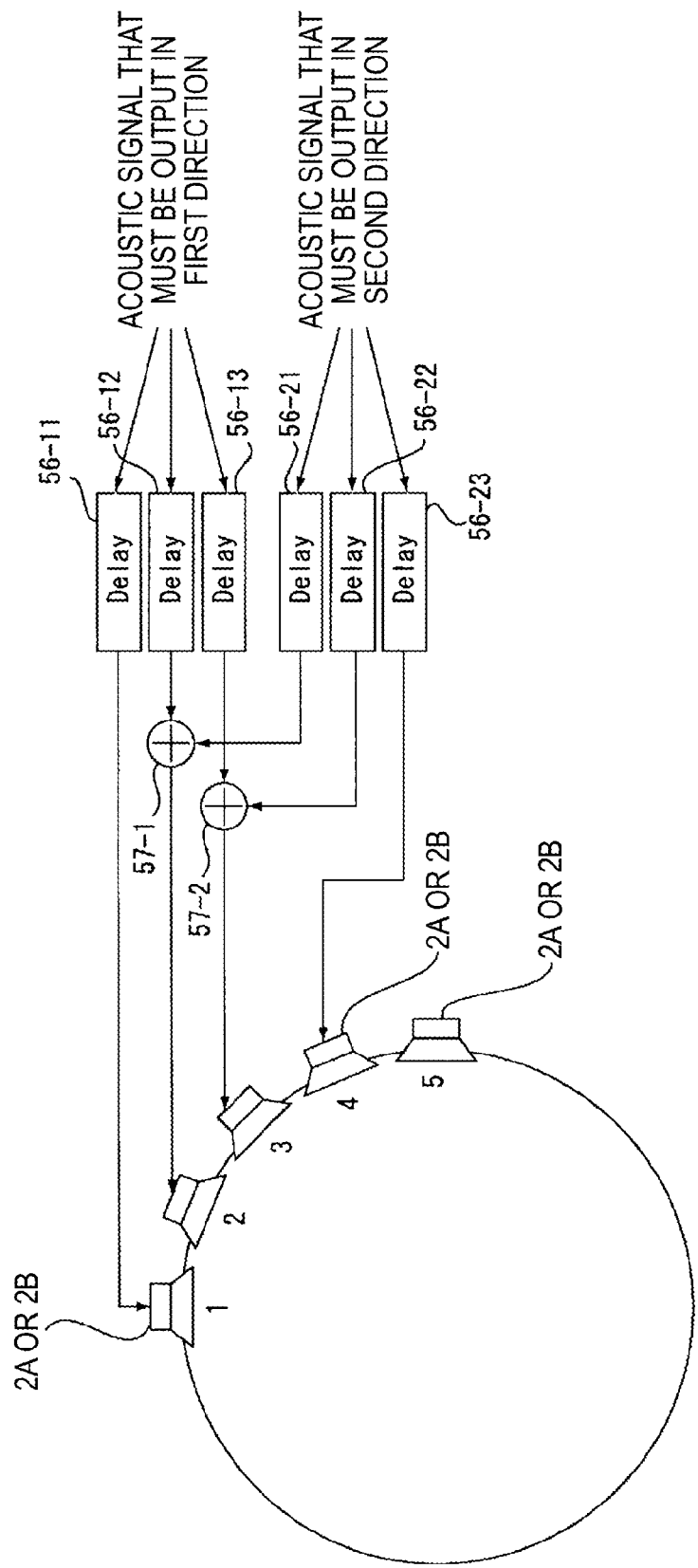
FIG. 22 is a diagram exemplifying a configuration for obtaining an output which is equivalent to that of directional speakers by using omni-directional speakers.

FIG. 22 shows an example of a configuration for obtaining an output which is equivalent to that of directional speakers by using omni-directional speakers 2A or 2B.

Speakers 2A or 2B are disposed at the edge from number 1 to number 5 in the order shown in the drawing in this case as well. In addition, together with the number 1 to number 5 speakers 2A or 2B, two sets of delay circuits, each set having three circuits, are provided (a set of the delay circuits 56-11 to 56-13 and another set of the delay circuits 56-21 to 56-23). Acoustic signals that must be output in a first direction are given to the delay circuits 56-11 to 56-13, and acoustic signals that must be output in a second direction are given to the delay circuits 56-21 to 56-23 as shown in the drawing.

An output of the delay circuit 56-11 is given to the number 1 speaker 2A or 2B. In addition, an output of the delay circuit 56-12 and an output of the delay circuit 56-21 are added by an addition unit 57-1 and given to the number 2 speaker 2A or 2B. In addition, an output of the delay circuit 56-13 and an output of the delay circuit 56-22 are added by an addition unit 57-2 and given to the number 3 speaker 2A or 2B. In addition, an output of the delay circuit 56-23 is given to the number 4 speaker 2A or 2B.

In the configuration described above, for example, by appropriately setting a delay amount of the delay circuits 56-11 to 56-13, an output sound in the predetermined first direction can be obtained as output sounds of the number 1 to number 3 speakers 2A or 2B. Likewise, by appropriately setting a delay amount of the delay circuits 56-21 to 56-23, an output sound in the predetermined second direction can be obtained as output sounds of the number 2 to number 4 speakers 2A or 2B.

Note for the sake of clarification that, when an application in which measurement sounds are output in each of directions (Q1 to QM) in order in a measurement environment is considered, an acoustic signal that must be output in the first direction and an acoustic signal that must be output in the second direction are not given to the delay circuits 56 at the same time, but given at deviated timings. When the measurement sounds are output in the first direction, for example, measurement signals are given only to the delay circuits 56-11 to 56-13, rather than the delay circuits 56-21 to 56-23, and on the other hand, when the measurement sounds are output in the second direction, measurement signals are given only to the delay circuits 56-21 to 56-23, rather than the delay circuits 56-11 to 56-13.

By applying appropriate delays to the acoustic signals given to the omni-directional speakers which are arrayed in plural as described above, a speaker array can be formed and an action that is equivalent to that of directional speakers can be obtained.

(6-3. Resolution for a Case in which Sizes and Shapes of Closed Surfaces Differ in a Measurement Environment and a Reproduction Environment)

For the sake of convenience in the above description, the case in which the set of the closed surfaces 1B and 1A and the set of the closed surfaces 4B and 4A respectively have the same size and shape in the relation of the site B and the site A has been exemplified; however, it is difficult in reality to precisely match positions of speakers and mics in a measurement environment with disposition of mics and speakers in a reproduction environment.

FIG. 23 shows an example of this.

In the site B shown in FIG. 23, the same closed surface 1B and closed surface 4B as shown in FIG. 5 above are assumed to be set.

In this case, ideally in the site A serving as a measurement environment, the closed surface 1A which has the same size and shape as the closed surface 1B and the closed surface 4A which has the same size and shape as the closed surface 4B must be set in the same positional relation as that of the closed surface 1B and the closed surface 4B, but this is very difficult in reality.

In the example of this drawing, a closed surface 1A' which has a different size and shape from the closed surface 1A and a closed surface 4A' which has a different size and shape from the closed surface 4A are assumed to be set in the site A as shown in the drawing.

Figure 24:
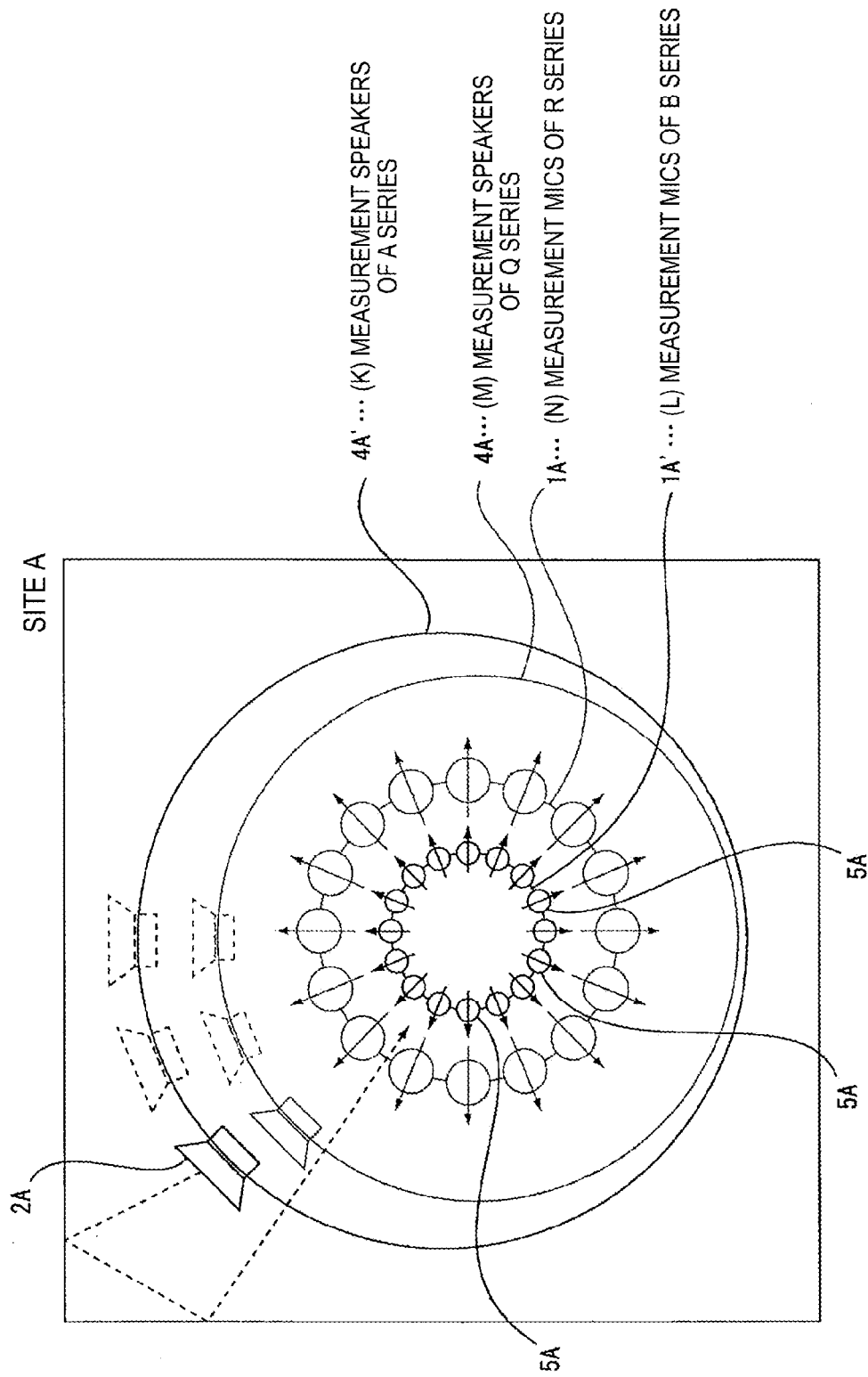
FIG. 24 is an illustrative diagram regarding a technique for converting a transfer function when sizes and shapes of closed surfaces differ in a measurement environment and reproduction environment.

Here, as shown in FIG. 24, speakers 2A disposed on the closed surface 4A' are set as measurement speakers of an A series. In addition, mics 5A disposed on the closed surface 1A' are set as measurement mics of a B series. Note that, as described so far, speakers 2A disposed on the original closed surface 4A are set as a Q series, and mics 5A disposed on the original closed surface 1A are set as an R series.

In this case, since the closed surface 4A' and the closed surface 4A have different sizes and shapes, the numbers of disposed speakers 2A are not the same. While the number of speakers 2A disposed on the original closed surface 4A is M as described above, the number of speakers 2A disposed on the closed surface 4A' is set to K.

Likewise, since the closed surface 1A' and the closed surface 1A have different sizes and shapes, the numbers of disposed mics 5A are not the same, and while the number of mics 5A disposed on the original closed surface 1A is N as described above, the number of mics 5A disposed on the closed surface 4A' is set to L.

In this case, M mics 5B of a V series are disposed on the closed surface 4B, and N speakers 2B of W series are disposed on the closed surface 1B in the site B.

On this premise, in order to realize proper sound field reproduction of Technique 1, acoustic signals that must be output from each of the speakers 2B may be obtained by performing an arithmetic operation accompanied with conversion of a transfer function as shown by following Expression 3.

[Math 3]

[Expression 3]

$$\begin{pmatrix} W_1 \\ W_2 \\ \vdots \\ W_N \end{pmatrix} = \begin{pmatrix} BR_{11} & BR_{21} & \cdots & BR_{L1} \\ BR_{12} & & & BR_{L2} \\ \vdots & & & \vdots \\ BR_{1N} & \cdots & & BR_{LN} \end{pmatrix} \begin{pmatrix} AB_{11} & AB_{21} & \cdots & AB_{K1} \\ AB_{12} & & & AB_{K2} \\ \vdots & & & \vdots \\ AB_{1L} & \cdots & & AB_{KL} \end{pmatrix} \begin{pmatrix} QA_{11} & QA_{21} & \cdots & QA_{M1} \\ QA_{12} & & & QA_{M2} \\ \vdots & & & \vdots \\ QA_{1K} & \cdots & & QA_{ML} \end{pmatrix} \begin{pmatrix} V_1 \\ V_2 \\ \vdots \\ V_M \end{pmatrix}$$

In Expression 3, however, $AB_{11}$ to $AB_{KL}$ indicate transfer functions from the respective positions of the speakers of the A series (A1 to AK) to the respective positions of the mics of the B series (B1 to BL). The transfer functions $AB_{11}$ to $AB_{KL}$ are measured from the results of the sequential outputs of measurement sounds at each of the positions of the speakers (at K spots in this case) and sequential collection of the sounds by each of the mics 5A (L mics in this case) in the measurement environment, like the above transfer functions $QR_{11}$ to $QR_{MN}$.

In addition, in Expression 3, $BR_{11}$ to $BR_{LN}$ indicate transfer functions from the respective positions of the mics of the B series (B1 to BL) to the respective positions of the mics of the R series (R1 to RN).

The transfer functions $BR_{11}$ to $BR_{LN}$ can be measured in a predetermined environment, for example, an anechoic chamber or the like, without actually constructing the closed surface 1A' and the closed surface 1A that are in the positional relation shown in the drawing in the site A serving as the measurement environment. Specifically, when closed surfaces having the same sizes and shapes as the closed surface 1A' and the closed surface 1A are respectively set as a closed surface 1a' and a closed surface 1a, the closed surface 1a' and the closed surface 1a are set in the same positional relation as the closed surface 1A' and the closed surface 1A shown in the drawing in, for example, an anechoic chamber, then measurement sounds are sequentially output from speakers from each of the positions (B1 to BL) of the B series as the closed surface 1a', and then the transfer functions can be measured from results obtained by sequentially collecting the sounds with the mics disposed at each of the positions (R1 to RN) of the R series as the closed surface 1a.

In addition, in Expression 3, $QA_{11}$ to $QA_{MK}$ indicate transfer functions from the respective positions of the speakers of the Q series (Q1 to QM) to the respective positions of the speakers of the A series (A1 to AK).

The transfer functions $QA_{11}$ to $QA_{MK}$ can also be measured in, for example, an anechoic chamber or the like. Specifically, when closed surfaces having the same sizes and shapes as the closed surface 4A and the closed surface 4A' are respectively set as a closed surface 4a and a closed surface 4a', the closed surface 4a and the closed surface 4a' are set in the same positional relation as the closed surface 4A and the closed surface 4A' as shown in the drawing in, for example, an anechoic chamber, then measurement sounds are sequentially output from the speakers at each of the positions (Q1 to QM) of the Q series as the closed surface 4a, and then the transfer functions can be measured from results obtained by sequentially collecting the sounds using mics disposed at each of the positions (A1 to AK) of the A series as the closed surface 4a'.

As described above, by measuring the group of transfer functions from the Q series to the A series and the group of transfer functions from the B series to the R series separately, even when the sizes and shapes of the closed surfaces differ in the measurement environment and the reproduction environment, the transfer functions obtained in the measurement environment can be appropriately converted, and thus appropriate sound field reproduction can be realized.

Note for the sake of clarification that Expression 3 described above means that appropriate sound field reproduction can be realized even when the number of mics and speakers to be used in a reproduction environment and a measurement environment are different. As an extreme case, for example, even when a headphone device of two channels of L/R in a reproduction environment is used, by performing measurement of the group of transfer functions from the Q series to the A series and the group of transfer functions from the B series to the R series in the same manner as described above, the group of transfer functions obtained in the measurement environment is converted using the group of transfer functions as in Expression 3, and thereby a sound field can be realized.

Here, although the group of first transfer functions necessary for realizing Technique 1 has been described above, even for the group of second transfer functions used in Technique 2, it is possible to resolve the case in which the size and shape of a closed surface are different in a measurement environment and a reproduction environment by converting the group of the transfer functions obtained in the measurement environment based on the same principle.

A specific technique thereof is also disclosed in JP 4775487B based on a proposal of the present inventors; however, for the sake of clarification, an overview of the technique will be described hereinbelow. The description will be provided with reference to FIG. 11 above.

In the reproduction environment (site B), for example, it is assumed that only a closed surface (denoted by a closed surface 1A', for example) that is smaller than the closed surface 1A shown in FIG. 11 can be set. In this case, the closed surface 1A is set as the Q series (M spots from Q1 to QM), and the closed surface 1A' is set as a P series (J spots from P1 to PJ).

If there is one spot at which a given sound source S is desired to be localized, for example, transfer functions measured in the site A which is a measurement environment of this case are transfer functions from the position to the respective positions of the mics of Q1 to QM. The transfer functions are set as $Q_1$ to $Q_M$. If the closed surface of the measurement environment and the closed surface of the reproduction environment have the same sizes and shapes, proper sound field reproduction is possible by processing the sound source S with the transfer functions $Q_1$ to $Q_M$.

In this case, the group of the transfer functions from the Q series to the P series are measured under an environment, for example, an anechoic chamber or the like in association with a case in which the closed surface 1A and the closed surface 1A' have different sizes and the shapes. Specifically, the closed surface 1A and the closed surface 1A' are set in an anechoic chamber, measurement sounds are sequentially output from the speakers at each of the positions (Q1 to QM) of the Q series as the closed surface 1A, then the transfer functions $QP_{11}$ to $QP_{MJ}$ are measured from the results obtained by sequentially collecting the sounds using the mics disposed at each of the positions (P1 to PJ) of the P series as the closed surface 1A'.

Moreover, acoustic signals ($X_1$ to $X_J$) that must be output from J speakers (X1 to XJ) which are disposed in the reproduction environment are obtained using the following Expression 4.

[Math 4]

$$\begin{pmatrix} X_1 \\ X_2 \\ \vdots \\ X_J \end{pmatrix} = \begin{pmatrix} QP_{11} & QP_{21} & \cdots & QP_{M1} \\ QP_{12} & & & QP_{M2} \\ \vdots & & & \vdots \\ QP_{1J} & \cdots & & QP_{MJ} \end{pmatrix} \begin{pmatrix} Q_1 \\ Q_2 \\ \vdots \\ Q_M \end{pmatrix} S$$ [Expression 4]

In this manner, it is also possible to resolve the case in which the closed surfaces have different sizes and shapes in the measurement environment and the reproduction environment (the number of mics in the measurement environment is different from the number of speakers in the reproduction environment) in Technique 2.

(6-4. Measurement Technique Using Moving Objects)

In order to realize a reproduction operation as an embodiment, it is desirable to perform measurement of transfer functions in many places. This is so in order to increase places that can be reproduced.

Using a moving object such as a vehicle on which a speaker or a mic is mounted is effective for efficiently measuring transfer functions in many places.

Hereinbelow, an example of a measurement technique using a moving object will be described.

Figure 25:
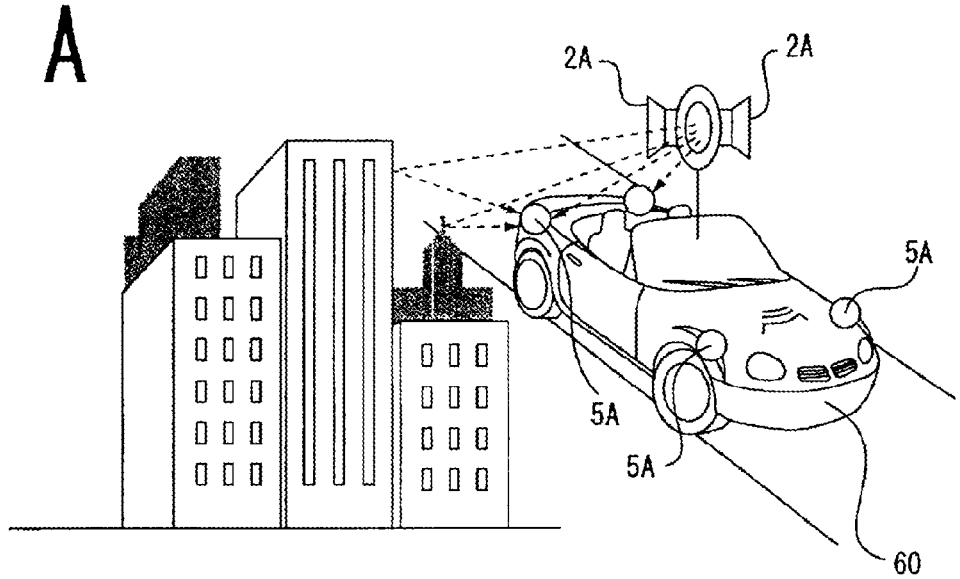
FIG. 25 is an illustrative diagram regarding Measurement example 1 in which a moving object is used.

FIG. 25 is an illustrative diagram regarding Measurement example 1 in which a moving object is used.

In Measurement example 1, in a vehicle 60 on which a plurality of speakers 2A and a plurality of mics 5A are mounted, transfer functions are measured as shown in FIG. 25A. The plurality of speakers 2A and the plurality of mics 5A in disposition shown in FIG. 6 above are mounted on the vehicle 60. Measurement example 1 is mostly favorable for measuring the first transfer functions necessary for Technique 1.

By repeating measurement and movement using the vehicle 60 as described above, transfer functions are sequentially acquired in each place.

FIG. 25B exemplifies the content of a database of the transfer functions measured in Measurement example 1.

In the database, transfer function IDs, sound emission positions, sound reception positions, measurement dates and times, and data (impulse response measurement data) are associated with each other as shown in the drawing. In this case, for the information of the sound emission positions, position information of a Global Positioning System (GPS) reception device mounted on the vehicle 60 is used. In addition, identification numbers of the mics 5A mounted on the vehicle 60 are set as the information of the sound reception position of this case.

Figure 26:
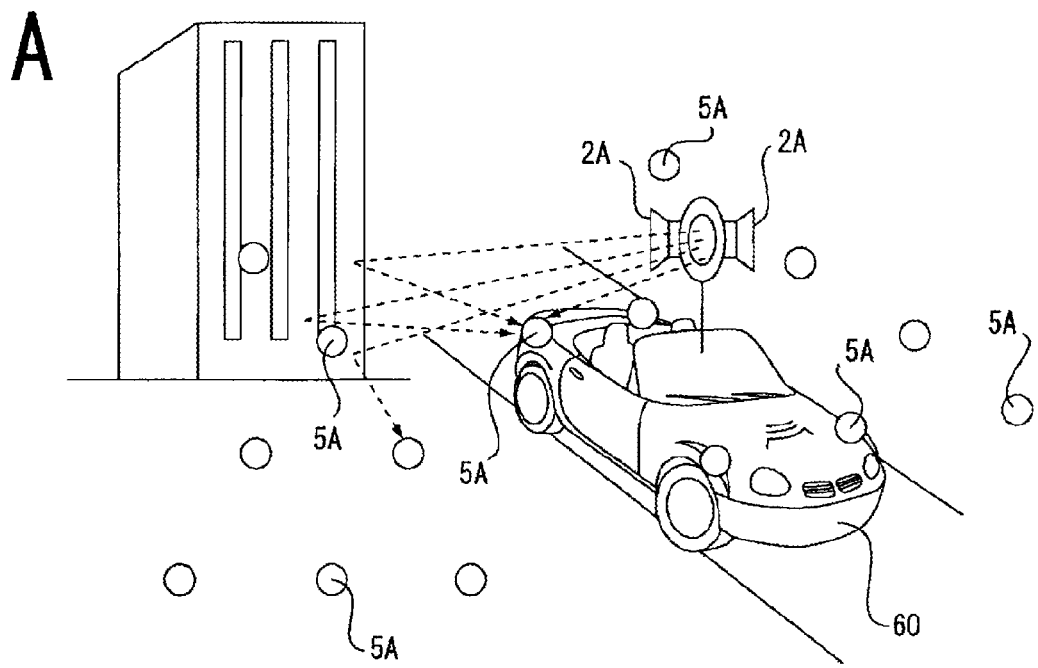
FIG. 26 is an illustrative diagram regarding Measurement example 2 in which a moving object is used.

FIG. 26 is an illustrative diagram regarding Measurement example 2 in which a moving object is used.

As shown in FIG. 26A, a plurality of mics 5A are installed on the street in a fixed or semi-fixed manner in Measurement example 2. As installation positions of the mics 5A on the street, for example, a ground surface, a utility pole, a wall, a sign, and the like can be exemplified. In addition, installing a mic on a surveillance camera and the like is also considered.

In this case, as a moving object, the vehicle 60 that is used in Measurement example 1 (on which the speakers 2A and the mics 5A are mounted) is also used.

With the mics 5A installed on the vehicle 60, the first transfer functions can be measured.

To measure the second transfer functions in this case, measurement sounds emitted from the speakers 2A installed on the vehicle 60 are received by the mics 5A installed on the street (the mics A installed on the vehicle 60 may also be used). Since many mics 5A are installed on the street in Measurement example 2, many transfer functions can be obtained in one measurement.

By storing the many transfer functions measured in this way in a database as shown in FIG. 26B, a necessary transfer function can be appropriately selected therefrom and used later.

A difference of the database shown in FIG. 26B from the database shown in FIG. 25B above is that the information of the sound reception positions is set as absolute position information. This facilitates specification of a positional relation between sound emission positions each time a necessary transfer function is selected from the database.

FIG. 27 is an illustrative diagram regarding Measurement example 3 and Measurement example 4 in which moving objects are used.

Measurement examples 3 and 4 are those in which a plurality of moving objects are used.

In Measurement example 3 shown in FIG. 27A, the vehicle 60, a vehicle 61 ahead of the vehicle 60, and a vehicle 62 behind the vehicle 60 are used as the moving objects.

Here, when vehicles are used as moving objects, the vehicles are driven on a road particularly in measurement on a street. In this case, it is difficult to fixedly install mics 5A on the road, and if only one vehicle is used, formation of blank segments ahead of and behind the vehicle in which transfer functions are not measured is a concern. In the Measurement examples 3 and 4, such a blank segment can be filled.

In Measurement example 3 as shown in FIG. 27A, only mics 5A rather than speakers 2A are set to be installed in the foremost vehicle 61 and the rearmost vehicle 62. In this example, the database as shown in FIG. 26B above is constructed including the positions of the mics 5A (sound reception positions) on the vehicles 61 and 62.

In addition, in Measurement example 4 of FIG. 27B, a vehicle 63 on which only the speakers 2A are mounted is set to be used instead of the vehicle 60 in Measurement example 3 shown in FIG. 27A.

In this case, the first transfer functions are measured using the mics 5A on the street and the mics 5A on the vehicles 61 and 62.

In addition, with respect to the second transfer functions of this case, many transfer functions can be measured at a time using the mics 5A on the street and the mics 5A on the vehicles 61 and 62.

Here, when a plurality of vehicles are used as in Measurement examples 3 and 4, by using different distances, directions, and the like of the plurality of vehicles of each case, transfer functions can also be obtained in combinations of more sound emission positions and sound reception positions.

Note that, in measurement using a vehicle, collecting sounds while the vehicle is not stopped but moving is also assumed. In this instance, by also recording a vehicle moving speed at the time of sound collection in a database, the Doppler effect can be subsequently reduced through signal processing.

In addition, when the mics 5A are provided on the street, if they are directional mics, it is very difficult to change the direction of directivity thereof after installation, and thus a degree of freedom in measurement is accordingly hampered. Considering this point, by preparing the mics 5A installed on the street as omni-directional mics, directivity can be changed through the process of a mic array described above. Accordingly, a degree of freedom in measurement can be enhanced, which is very effective for obtaining transfer functions in more patterns.

(6-5. Other Modified Examples)

Herein, the following modified examples to the present technology are possible.

In the above description, the case in which the object-separated sound source is used for the sound field reproduction of Technique 2 has been exemplified; however, processes such as noise removal, or reverberation suppression can also be implemented for sound collection signals of the mics 5B in sound field reproduction of Technique 1.

Here, in Technique 1, sounds for sound field reproduction are output from the speakers 2B which are disposed in the site B. At this moment, the mics 5B which collects sound produced by the user 0 are disposed relatively close to the speakers 2B in the site B, and the sounds from the speakers 2B are collected by the mics 5B for sound field reproduction. This means that, whereas a process using the first transfer functions must be originally performed only on sounds emitted by the user 0, the process using the first transfer functions is performed on a sound to which sounds for sound field reproduction are added.

Thus, by performing the same process of noise removal or reverberation suppression as for the object-separated sound source on the sound collection signals of the mics 5B as described above, components of the sounds emitted from the user 0 are extracted. In other words, the process using the first transfer functions is performed on an object-separated sound source in this way. Accordingly, in the sound field reproduction of Technique 1, S/N can be enhanced and quality of sound field reproduction can be further improved.

Note that the above-described process of noise removal or reverberation suppression may be set to be performed between, for example, the ADC and amplifying unit 32 and the addition units 33 in the configuration shown in FIG. 12 above.

In addition, the above description has been provided on the premise that one image is displayed corresponding to one place; however, different images for, for example, respective time zones can also be displayed. For example, a plurality of images are photographed and stored for respective time zones of a reproduction target place. Among the images, an image of, for example, a time zone according to current time information timed by the signal processing device 30 placed in a reproduction environment, or a time zone according to a current time of a reproduction target place (which is obtained from, for example, calculation of a current time timed by the signal processing device 30) is selected and displayed. Alternatively, an image of an arbitrary time zone designated by the user 0 may be selected and displayed.

Note that reproduction according to a time zone described above can also be applied to sound field reproduction of Technique 2. Specifically, a plurality of object-separated sound sources of respective time zones are prepared for one place, and a sound source of a time zone according to a current time of a reproduction environment or a reproduction target place, or an arbitrary time zone designated by the user 0 is output as a reproduction sound.

By realizing reproduction according to the time zone in this way, a sense of presence can be further heightened.

In addition, in the above description, the case in which reproduction of a place based on position information designated on a map is performed has been exemplified; however, information of a current position detected on, for example, the GPS may be used as designated position information. In other words, reproduction is performed for a place that is specified from current position information detected on the GPS.

This is favorable for a system in which, for example, a calling partner of the user 0 who is in a reproduction environment is present in a remote place and a sound field of the place in which the calling partner is located is reproduced. In this case, current position information detected by, for example, a mobile telephone or the like used by the calling partner is transmitted to the server device 25 and the server device 25 specifies a corresponding place based on the current position information.

In addition, although the case in which measurement is performed using TSP signals as measurement signals has been exemplified in the above description, measurement may be performed using an M series instead.

In addition, when the system in which many transfer functions are measured in combination of various sound emission positions and sound reception positions on a street as shown in FIGS. 26 and 27 above and a necessary transfer function is selected therefrom and used later is assumed, there are cases in which data of the necessary transfer function is not included in the database. When a necessary transfer function is not included in a database in this way, the necessary transfer function can be estimated by performing interpolation with other present transfer functions.

In addition, when the mics 5A are installed on the street in a fixed or semi-fixed manner, sounds of the reproduction target place may be collected using the mics 5A in real time, transmitted to the signal processing device 30 of the reproduction environment via the network 26, and then output from the speakers 2B.

Additionally, the present technology may also be configured as below.

(1)

A signal processing device including:

an input unit configured to input a sound collection signal of a sound produced by a user which is obtained through sound collection by a plurality of microphones which are disposed to surround the user with inward directivity in a reproduction environment;

an acoustic signal processing unit configured to obtain a reproduction signal for reproducing a sound field in a measurement environment by performing a process on the sound collection signal input by the input unit based on a transfer function which is measured based on a result obtained by sequentially emitting predetermined sounds from speakers at each of a plurality of positions which are set on a first closed surface with outward directivity in the measurement environment and then collecting the sequentially emitted sounds with microphones at a plurality of positions which are set on a second closed surface with outward directivity in the measurement environment and indicates how the sounds emitted from the respective plurality of positions on the first closed surface are transferred to the respective plurality of positions on the second closed surface; and a sound emission control unit configured to cause a plurality of speakers which are disposed to surround the user and perform sound emission with inward directivity in the reproduction environment to emit a sound based on the reproduction signal obtained by the acoustic signal processing unit.

(2)

The signal processing device according to (1), wherein the acoustic signal processing unit uses a transfer function of which balance of components of a direct sound, an early reflection sound, and a reverberant sound is adjusted is used as the transfer function.

(3)

The signal processing device according to (1) or (2), wherein the acoustic signal processing unit performs a process of suppressing noise and reverberation on the sound collection signal and then a process on the signal based on the transfer function.

(4)

The signal processing device according to any one of (1) to (3), further including:

a first addition unit configured to add a necessary acoustic signal to the sound collection signal, wherein the acoustic signal processing unit performs a process based on the transfer function on the sound collection signal to which the acoustic signal has been added by the first addition unit.

(5)

The signal processing device according to any one of (1) to (4), further including:

a second addition unit configured to add an acoustic signal that is based on a sound source recorded in the measurement environment to the reproduction signal obtained in the process based on the transfer function performed by the acoustic signal processing unit.

(6)

The signal processing device according to any one of (1) to (5), wherein directional microphones are used as the plurality of microphones in the reproduction environment, and wherein the input unit inputs a sound collection signal of the directional microphones.

(7)

The signal processing device according to any one of (1) to (5), wherein omni-directional microphones are used as the plurality of microphones in the reproduction environment, and wherein the input unit obtains a sound collection signal that is equivalent to a sound collection signal obtained when directional microphones are used by adjusting a delay of an output of a plurality of the omni-directional microphones.

(8)

The signal processing device according to any one of (1) to (7), wherein directional speakers are used as the plurality of speakers in the reproduction environment, and wherein the sound emission control unit causes the directional speakers to emit a sound based on the reproduction signal.

(9)

The signal processing device according to any one of (1) to (7), wherein omni-directional speakers are used as the plurality of speakers in the reproduction environment, and wherein the sound emission control unit realizes sound emission that is equivalent to sound emission obtained when directional speakers are used by adjusting a delay of a signal that causes a plurality of the omni-directional speakers to emit a sound.

(10)

The signal processing device according to any one of (1) to (9), wherein, when a closed surface having the same size and shape as the first closed surface is set as a third closed surface, a closed surface having the same size and shape as the second closed surface is set as a fourth closed surface, a closed surface having the same size and shape as a closed surface formed by the plurality of microphones that are disposed in the reproduction environment to surround the user is set as a fifth closed surface, and a closed surface having the same size and shape as a closed surface formed by the plurality of speakers that are disposed in the reproduction environment to surround the user is set as a sixth closed surface, the acoustic signal processing unit performs a process on the sound collection signal based on a transfer function obtained by converting a transfer function that is measured in the measurement environment based on a transfer function from each position on the fifth closed surface to each position on the third closed surface and a transfer function from each position on the sixth closed surface to each position on the fourth closed surface when the third to sixth closed surfaces are set under the same environment.

A measurement method, wherein, based on a result obtained by sequentially emitting predetermined sounds from speakers at each of a plurality of positions which are set on a first closed surface with outward directivity in a measurement environment and collecting the sequentially output sounds with microphones at a plurality of positions which are set on a second closed surface with outward directivity in the measurement environment, a transfer function that indicates how the sounds emitted from the respective plurality of positions on the first closed surface are transferred to the respective plurality of positions on the second closed surface is measured.

(12)

The measurement method according to (11), wherein the transfer function is measured using a moving object on which at least speakers or microphones are mounted.

(13)

The measurement method according to (12), wherein both speakers and microphones are mounted on the moving object, and wherein the transfer function is measured based on a result obtained by collecting a measurement signal emitted from the speakers of the moving object with the microphones of the moving object.

(14)

The measurement method according to (12), wherein the speakers are mounted on the moving object, wherein a plurality of microphones are installed in the measurement environment, and wherein the transfer function is measured based on a result obtained by collecting a measurement signal emitted from the speakers of the moving object with the microphones installed in the measurement environment.

(15)

The measurement method according to any one of (11) to (14), wherein directional microphones are used as the microphones.

(16)

The measurement method according to any one of (11) to (14), wherein omni-directional microphones are used as the microphones, and a sound collection signal that is equivalent to a sound collection signal obtained when directional microphones are used is obtained by adjusting a delay of an output of the plurality of omni-directional microphones.

(17)

The measurement method according to any one of (11) to (16), wherein directional speakers are used as the speakers.

(18)

The measurement method according to any one of (11) to (16), wherein omni-directional speakers are used as the speakers, and sound emission that is equivalent to sound emission obtained when directional speakers are used is realized by adjusting a delay of an input to the plurality of omni-directional speakers.

REFERENCE SIGNS LIST 0 user
1A, 1B, 4A, 4B closed surface (acoustic closed surface)
2A, 2B speaker
3 display device
5A, 5B microphone
10 measurement device
11-1 to 11-M, 12-1 to 12-N, 39-1 to 39-N, 43 terminal unit
13, 32 ADC and amplifying unit
14 transfer function measurement unit
15, 40 control unit
16 measurement signal output unit
17, 38 DAC and amplifying unit
18 selector
19 signal component decomposition processing unit 19
20, 21 multiplication unit
22, 31-1 to 33-M, 37-1 to 37-N, 51-1 to 51-N, 55-1, 55-2, 57-1, 57-2 addition unit
25 server device
26 network
30 signal processing device
34, 36 howling control and echo cancellation unit
41 operation unit
42 display control unit
44 communication unit
45 memory
46 reference sound replay unit
47, 52 rendering unit
50-11 to 50-1N, 50-21 to 50-2N, 50-M1 to 50-MN filter
53 output control unit
54-11 to 54-13, 54-21 to 54-23, 56-11 to 56-13, 56-21 to 56-23 delay circuit

The invention claimed is:

1. A signal processing device comprising:

an input unit configured to input a sound collection signal of a sound produced by a user which is obtained through sound collection by a plurality of microphones which are disposed to surround the user with inward directivity in a reproduction environment;

an acoustic signal processing unit configured to obtain a reproduction signal for reproducing a sound field in a measurement environment by performing a process on the sound collection signal input by the input unit based on a transfer function which is measured based on a result obtained by sequentially emitting predetermined sounds from speakers at each of a plurality of positions which are set on a first closed surface with outward directivity in the measurement environment and then collecting the sequentially emitted sounds with microphones at a plurality of positions which are set on a second closed surface with outward directivity in the measurement environment and indicates how the sounds emitted from the respective plurality of positions on the first closed surface are transferred to the respective plurality of positions on the second closed surface; and a sound emission control unit configured to cause a plurality of speakers which are disposed to surround the user and perform sound emission with inward directivity in the reproduction environment to emit a sound based on the reproduction signal obtained by the acoustic signal processing unit;

wherein the acoustic signal processing unit uses a transfer function of which components of a direct sound, an early reflection sound, and a reverberant sound are combined to be used as the transfer function.

2. The signal processing device according to claim 1, wherein the acoustic signal processing unit performs a process of suppressing noise and reverberation on the sound collection signal and then a process on the signal based on the transfer function.

3. The signal processing device according to claim 1, further comprising:
a first addition unit configured to add a necessary acoustic signal to the sound collection signal,
wherein the acoustic signal processing unit performs a process based on the transfer function on the sound collection signal to which the acoustic signal has been added by the first addition unit.

4. The signal processing device according to claim 1, further comprising:
a second addition unit configured to add an acoustic signal that is based on a sound source recorded in the measurement environment to the reproduction signal obtained in the process based on the transfer function performed by the acoustic signal processing unit.

5. The signal processing device according to claim 1, wherein directional microphones are used as the plurality of microphones in the reproduction environment, and
wherein the input unit inputs a sound collection signal of the directional microphones.

6. The signal processing device according to claim 1, wherein omni-directional microphones are used as the plurality of microphones in the reproduction environment, and
wherein the input unit obtains a sound collection signal that is equivalent to a sound collection signal obtained when directional microphones are used by adjusting a delay of an output of a plurality of the omni-directional microphones.

7. The signal processing device according to claim 1, wherein directional speakers are used as the plurality of speakers in the reproduction environment, and
wherein the sound emission control unit causes the directional speakers to emit a sound based on the reproduction signal.

8. The signal processing device according to claim 1, wherein omni-directional speakers are used as the plurality of speakers in the reproduction environment, and
wherein the sound emission control unit realizes sound emission that is equivalent to sound emission obtained when directional speakers are used by adjusting a delay of a signal that causes a plurality of the omni-directional speakers to emit a sound.

9. The signal processing device according to claim 1, wherein, when a closed surface having the same size and shape as the first closed surface is set as a third closed surface, a closed surface having the same size and shape as the second closed surface is set as a fourth closed surface, a closed surface having the same size and shape as a closed surface formed by the plurality of microphones that are disposed in the reproduction environment to surround the user is set as a fifth closed surface, and a closed surface having the same size and shape as a closed surface formed by the plurality of speakers that are disposed in the reproduction environment to surround the user is set as a sixth closed surface, the acoustic signal processing unit performs a process on the sound collection signal based on a transfer function obtained by converting a transfer function that is measured in the measurement environment based on a transfer function from each position on the fifth closed surface to each position on the third closed surface and a transfer function from each position on the sixth closed surface to each position on the fourth closed surface when the third to sixth closed surfaces are set under the same environment.

10. A signal processing method comprising:
an input procedure in which a sound collection signal of a sound produced by a user which is obtained through sound collection by a plurality of microphones which are disposed to surround the user with inward directivity in a reproduction environment is input;
an acoustic signal processing procedure in which a reproduction signal for reproducing a sound field in a measurement environment is obtained by performing a process on the sound collection signal input in the input procedure based on a transfer function which is measured based on a result obtained by sequentially emitting predetermined sounds from speakers at each of a plurality of positions which are set on a first closed surface with outward directivity in the measurement environment and then collecting the sequentially emitted sounds with microphones at a plurality of positions which are set on a second closed surface with outward directivity in the measurement environment and indicates how the sounds emitted from the respective plurality of positions on the first closed surface are transferred to the respective plurality of positions on the second closed surface; and
a sound emission control procedure in which a plurality of speakers which are disposed to surround the user and perform sound emission with inward directivity in the reproduction environment are caused to emit a sound based on the reproduction signal obtained in the acoustic signal processing procedure;
wherein the acoustic signal processing procedure uses a transfer function of which components of a direct sound, an early reflection sound, and a reverberant sound are combined to be used as the transfer function.

11. A measurement method, wherein, based on a result obtained by sequentially emitting predetermined sounds from speakers at each of a plurality of positions which are set on a first closed surface with outward directivity in a measurement environment and collecting the sequentially output sounds with microphones at a plurality of positions which are set on a second closed surface with outward directivity in the measurement environment, a transfer function that indicates how the sounds emitted from the respective plurality of positions on the first closed surface are transferred to the respective plurality of positions on the second closed surface is measured, wherein components of a direct sound, an early reflection sound, and a reverberant sound are combined to be used as the transfer function.

12. The measurement method according to claim 11, wherein the transfer function is measured using a moving object on which at least speakers or microphones are mounted.

13. The measurement method according to claim 12,
wherein both speakers and microphones are mounted on the moving object, and
wherein the transfer function is measured based on a result obtained by collecting a measurement signal emitted from the speakers of the moving object with the microphones of the moving object.

14. The measurement method according to claim 12,
wherein the speakers are mounted on the moving object,
wherein a plurality of microphones are installed in the measurement environment, and
wherein the transfer function is measured based on a result obtained by collecting a measurement signal emitted from the speakers of the moving object with the microphones installed in the measurement environment.

15. The measurement method according to claim 11, wherein directional microphones are used as the microphones.

16. The measurement method according to claim 11, wherein omni-directional microphones are used as the microphones, and a sound collection signal that is equivalent to a sound collection signal obtained when directional microphones are used is obtained by adjusting a delay of an output of the plurality of omni-directional microphones.

17. The measurement method according to claim 11, wherein directional speakers are used as the speakers.

18. The measurement method according to claim 11, wherein omni-directional speakers are used as the speakers, and sound emission that is equivalent to sound emission obtained when directional speakers are used is realized by adjusting a delay of an input to the plurality of omni-directional speakers.

19. A measurement device comprising:
a sound emission control unit configured to cause speakers installed on a first closed surface to emit predetermined sounds in a manner that the predetermined sounds are sequentially emitted from each of a plurality of positions which are set on the first closed surface with outward directivity in a measurement environment; and
a measurement unit configured to sequentially input sound collection signals of sounds that are sequentially emitted under control of the sound emission control unit and obtained through sound collection with microphones installed at a plurality of positions which are set on a second closed surface with outward directivity in the measurement environment, and to measure, based on the sound collection signals, a transfer function that indicates how the respective sounds emitted from the respective plurality of positions on the first closed surface are transferred to the plurality of positions on the second closed surface;
wherein components of a direct sound, an early reflection sound, and a reverberant sound are combined to be used as the transfer function.

* * * * *